(12) United States Patent
Belhaiza et al.

(10) Patent No.: US 11,817,707 B2
(45) Date of Patent: Nov. 14, 2023

(54) SMART METER SYSTEM AND METHOD FOR MANAGING DEMAND RESPONSE IN A SMART GRID

(71) Applicant: King Fahd University of Petroleum and Minerals, Dhahran (SA)

(72) Inventors: Slim Belhaiza, Dhahran (SA); Uthman Baroudi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/225,466

(22) Filed: Dec. 19, 2018

(65) Prior Publication Data

US 2020/0212675 A1 Jul. 2, 2020

(51) Int. Cl.
*H02J 3/14* (2006.01)
*G01D 4/00* (2006.01)
*H02J 3/32* (2006.01)
*H02J 13/00* (2006.01)
*H02J 3/38* (2006.01)
*H02J 3/00* (2006.01)

(52) U.S. Cl.
CPC .............. *H02J 3/144* (2020.01); *G01D 4/002* (2013.01); *H02J 3/32* (2013.01); *H02J 3/38* (2013.01); *H02J 3/381* (2013.01); *H02J 13/00002* (2020.01); *H02J 3/003* (2020.01); *H02J 2203/10* (2020.01)

(58) Field of Classification Search
CPC ..................................................... H02J 13/14
USPC ....................................................... 700/291
See application file for complete search history.

(56) References Cited

U.S. PATENT DOCUMENTS

| 2010/0292856 | A1* | 11/2010 | Fujita ................... G06Q 10/04 700/291 |
| 2011/0231028 | A1* | 9/2011 | Ozog ................... G06Q 50/06 700/291 |
| 2012/0078687 | A1 | 3/2012 | Ghosh et al. |
| 2015/0357817 | A1* | 12/2015 | Van Den Briel ....... G06F 17/18 700/291 |

(Continued)

FOREIGN PATENT DOCUMENTS

| CN | 105528658 A | 4/2016 |
| CN | 105976066 A | 9/2016 |

(Continued)

OTHER PUBLICATIONS

Atzeni, et al. "Noncooperating and cooperative optimization of DEG and storage in demand side of the smart grid" IEEE Tran. on Signal Processing, V. 61 No. 10, May 15, 2013 (Year: 2013).*

(Continued)

*Primary Examiner* — Md Azad
(74) *Attorney, Agent, or Firm* — Oblon, McClelland, Maier & Neustadt, L.L.P.

(57) ABSTRACT

A smart meter system is described for managing demand side electrical transactions with shifted demand in a smart grid. The smart meter controller uses non-cooperative game theoretic analysis for managing multi-periodic smart grid shifted demand. The problems of user based electricity demand, production, storage, and sales of energy to providers are addressed. The smart meter system described is used in the control of Home-Area-Network (HAN) or Wide-Area-Network (WAN) demand response management (DRM).

9 Claims, 10 Drawing Sheets

(56) References Cited

U.S. PATENT DOCUMENTS

2016/0020609 A1* 1/2016 Carrasco ............... H02J 3/14
                                                    700/295
2017/0005515 A1* 1/2017 Sanders ............... H02J 3/381

FOREIGN PATENT DOCUMENTS

CN     107147105 A     9/2017
KR   10-2017-0000198   1/2017

OTHER PUBLICATIONS

Alshehri, et al.; Privacy-Preserving Multi-Period Demand Response: a Game Theoretic Approach; Jul. 15, 2018; 12 Pages.

* cited by examiner

SMART METER SYSTEM AND METHOD FOR MANAGING DEMAND RESPONSE IN A SMART GRID

BACKGROUND

Technical Field

The present disclosure relates to a smart meter system and method directed to managing demand side electrical transactions with shifted demand in a smart grid. The smart meter controller uses a non-cooperative game theoretic analysis for managing multi-periodic smart grid demand side with shifted demand. The system and methods described address the problems of user based electricity demand, production, storage, and sales of energy to providers. The system and methods described may be used in the control of Home-Area-Network (HAN) or Wide-Area-Network (WAN) demand response management (DRM).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The smart grid is a large-scale cyber-physical system that intelligently integrates advanced techniques such as signal processing, control, power systems, communications, and networking to provide reliable, efficient, robust and cost saving energy generation and distribution. As depicted in FIG. 1, the smart grid is a hierarchical structured network which enables information collection and exchanging control signaling via an advanced metering system for a smart grid.

This advanced infrastructure enables a smart grid to provide real time monitoring and two-way control. The smart grid provides the ability for distribution operators to match supply with demand and increase digital power. The smart grid, therefore, poses great challenges and opportunities, as it requires delivery of both energy and information.

One of these challenges is the management of demand response under dynamic pricing. Dynamic pricing and demand response are often seen as a means to mitigate the uncertainties and intermittencies of renewable energy generation and further to improve the system's efficiency with respect to environmental and economic metrics. Demand response management (DRM) is the end user's response to electricity price changes over time or to other forms of incentives. In the smart grid, DRM plays an important role in improving different aspects of both supply side and demand side. For instance, DRM can result in higher utility efficiency and lower bills for end users. In addition, DRM can reduce power generation cost or increase retailer revenue or company utility costs.

A further challenge is that, in the smart grid, temporal variations play a critical role on both the supply side and the demand side. On the supply side, it can be more costly to produce one unit of power in a hot summer afternoon than later in the same day. Furthermore, temporal variations also affect the available power from renewable sources. On the demand side, consumers typically use more energy during the day than in the evening. Such variations also make demand response programs important, as they provide economic incentives to consumers to shift some of their consumption. Demand Response compensates end-use (retail) customers for reducing their electricity use (load), during periods of high power prices or when the reliability of the grid is threatened. "Shifted demand" refers to temporally delaying or advancing the receipt or satisfaction of a power transaction, such as receiving electricity or selling electricity.

The DRM problem can be tackled via several techniques. The following are prominent DRM techniques: peak clipping, load shifting, load building, conservation, valley filling and flexible load. The most effective load management technique is load shifting, which shifts loads from peak time to off-peak time.

Zheng et al. propose an agent-based economic model for electricity storage and consumption to evaluate the viability of tariff arbitrage for domestic demand response. Electricity storage is distributed on need to appliances in order to lower consumption peaks on the smart grid. Zheng et al. addresses the difficulties imposed by fluctuating electricity tariffs through a stochastic model which simulates electricity demand. The proposed model of Zheng et al. allows load shift of the demand via dispatch strategies with the objective of maximizing the potential profit of the building owners. (M. Zheng, C. J. Meinrenken, K. S. Lackner, "Agent-based model for electricity consumption and storage to evaluate economic viability of tariff arbitrage for residential sector demand response", Applied Energy, vol. 126, 2014, pp. 297-306)

The existing literature assumes ideal channel conditions when addressing the issue of DRM communication and ignores the impact of channel impairments on the effectiveness of DRM. Given the critical role played by the smart grid information network in exchanging the required information for proper operation DRM, it becomes important to overcome the lack of channel reliability in delivering exchanged information and, in particular, command and control signaling.

Recently, channel reliability has been investigated in the context of the smart grid impact on network performance. He et al. investigated the channel error on power grid information exchanged on the bus susceptance matrix, which shows a considerable effect on the power flow calculations. (Q. He, C. Wei and R. S. Blum, "Effects of unsuccessful transmissions of measurements on uncertainty in power flow calculations", 7th IEEE Sensor Array and Multichannel Signal Processing Workshop (SAM), vol., no., pp. 461, 464, 17-20 Jun. 2012). Niyato et al. investigated the impact on electricity demand estimation of packet loss caused by wireless channel impairments. (D. Niyato, P. Wang, Z. Han, E. Hossain, "Impact of packet loss on power demand estimation and power supply cost in smart grid", IEEE Wireless Communications and Networking Conference (WCNC), 2011).

Several methodologies were proposed by Zheng and Cai to improve wireless communication network performance reliability and to support DRM control. (L. Zheng, N. Lu, L. Cai, "Reliable Wireless Communication Networks for Demand Response Control", IEEE Transactions on Smart Grid, vol. 4, no. 1, 2013, pp. 133-140).

Game Theory is an effective tool that can be employed for devising strategies which improve performance requirements under realistic channel assumptions. A game theoretic model for the DRM considering an erroneous communication channel has been proposed. (Slim Belhaiza, U. Baroudi, "A Game Theoretic Model for Smart Grids Demand Management", IEEE Transaction on Smart Grid, 6, 2015, pp.

1386-1393, hereby incorporated by reference in its entirety). A mixed integer linear programming approach was presented to compute non-dominated Pareto extreme Nash equilibria. This model has limitations as it focuses solely on a single period scenario, and does not take into account the possibility of users shifting their electricity demand, producing, storing, or selling energy back to the providers. These features must be addressed as they represent the most recent advances within the smart grid demand response problem.

Game theory is a conceptual and analytical framework that studies complex interactions among independent and rational players. Game theory includes many with mathematical tools and can be divided into two main branches: cooperative and non-cooperative.

Non-cooperative game theory analyzes independent agent's strategic decision making processes. These agents may have partially or totally conflicting interests. Non-cooperative game theory can be used for real-time demand-side management monitoring. An n-person game was used to model energy price competition where the price set by one of the players affects the other player's payoffs. Two models have been proposed.

In the first model, a Nash equilibrium solution was investigated and shown to be unique under some assumptions (J. F. Nash, "Equilibrium points in n-person games", Proceedings of the National Academy of Sciences, 36, 1950), incorporated herein by reference in its entirety. The second model assumes that the energy price function includes two main factors: the energy generation cost and the homeowner's reaction to energy usage change.

Rajasekharan et al. show that adjusting the price function does not increase the expected profit (J. Rajasekharan, J. Lunden, V. Koivunen, "Competitive equilibrium pricing and cooperation in smart grids with energy storage", 2013, 47$^{th}$ Annual Conference on Information Sciences and Systems, CISS 2013), incorporated herein by reference in its entirety. Rajasekharan et al. developed a cooperative smart grid game theoretic model for local neighborhood households including systems for energy storage. To minimize consumption cost, users cooperate to exchange energy stored or supplied by a company. The pricing gaps provide benefit under user cooperation. A simple economic market where two users exchange goods is detailed. By cooperating in energy usage and storage, users were able to auto-regulate, resulting in reduced costs.

Atzen et al. investigated smart grids in which the demand-side includes two types of users: regular users and users equipped with energy storage and distribution devices. It was assumed that independent central units exist to enable non-traditional users to control their energy expenses by storing or producing energy instead of buying directly from the grid. Atzen et al. proposed a non-cooperative game model to solve the smart grid demand-side management problem. They analyzed the existence of optimal strategies and presented an algorithm to be deployed on the smart meters of the users. (I. Atzeni, L. G. Ordonez, G. Scutari, D, P. Palomar, J. R. Fonollosa, "Noncooperative and Cooperative Optimization of Distributed Energy Generation and Storage in the Demand-Side of the Smart Grid", IEEE Transactions on Signal Processing, vol. 4, no. 2, 2013, pp. 2454-2474) and (I. Atzeni, L. G. Ordonez, G. Scutari, D, P. Palomar, J. R. Fonollosa, "Demand-side management via distributed energy generation and storage optimization", IEEE Transactions on Smart Grid, vol. 4, no. 2, 2013, pp. 866-876), each incorporated herein by reference in its entirety.

Nguyen et al. investigated a smart power system in which users dynamically request energy from a provider. Energy prices are dynamically updated by the provider using data collected on customer consumption. It was assumed that users charge their batteries at periods of low-demand and discharge at periods of high demand. They emphasized minimizing the power system Peak-to-Average Ratio (PAR). To do so, Nguyen et al. proposed an algorithm using a game theoretical approach where users minimize their total cost. The proposed model was tested using simulation and the results showed that the algorithm simultaneously minimizes the PAR and the total energy cost. (H. K. Nguyen, J. B. Song, Z. Han, "Demand side management to reduce Peak-to-Average Ratio using game theory in smart grid", 2012 IEEE Conference on Computer Communications Workshops, INFOCOM WKSHPS 2012), incorporated herein by reference in its entirety.

The solutions proposed by the aforementioned literature are limited as they do not fully account for the dynamic situation in which users must manage buying energy, shifting their electricity demand times, producing energy, storing energy, and selling energy back to the providers. These features must be addressed in order to fully take advantage of smart grid capabilities and manage demand response.

Accordingly, it is one object of the present disclosure to provide a smart grid system and method that takes into account the dynamic aspects of energy demand and utilization for improved smart grid capabilities and management of demand response.

SUMMARY

In one aspect the present disclosure provides a system for managing demand side electrical transactions with shifted demand in a smart grid, a method for managing demand side electrical transactions with shifted demand in a smart grid and a non-transitory computer readable medium having instructions stored therein that, when executed by one or more processors, causes the one or more processors to perform a method of managing demand side electrical transactions with shifted demand in a smart grid, especially as it relates to the control of Home-Area-Network (HAN) or Wide-Area-Network (WAN) demand response management (DRM).

In a first embodiment, a smart meter system for managing demand side electrical transactions with shifted demand in a smart grid is disclosed. A plurality of smart meters are connected in the smart grid. Each smart meter is connected to electrical devices of a user. Each smart meter comprises a controller including circuitry having program instructions configured to analyze data communications between the smart meter and at least one electrical power generating station, a utility communications node connected to a distribution substation and each other smart meter of a plurality of the plurality of smart meters in the smart grid.

The controller of the smart meter participates as an agent in a non-cooperative multi-periodic smart grid game with shifted demand in order to determine electrical transactions between the smart meter of the user and at least one electrical power generating station, the utility, and the electrical devices of the user. The electrical transaction is at least one of distributing electrical power from a distribution substation to the smart meter of an electricity user, storing electrical power in a storage battery of the at least one user, supplying electrical power by the smart meter from a storage battery of the at least one user to the distribution substation, demanding, by the smart meter, electrical power from the distribution station and delaying an energy transaction between the smart meter and the distribution substation.

In the determination of the electrical transaction by the controller, the non-cooperative multi-periodic smart grid game with shifted demand results in reaching a Nash equilibrium and obtaining linear objective functions for the utility of each agent of the smart grid game with shifted demand.

In an exemplary embodiment, a method of managing demand side electrical transactions with shifted demand in a smart grid is disclosed. The method begins by connecting electrical power generating stations, electrical power distributing substations, a plurality of smart meters and electric utilities in both a power distribution network and a bidirectional communications network. The method continues by each smart meter and every electric power generating station participating as an agent in a non-cooperative multi-periodic smart grid game with shifted demand for determining an electrical transaction between the smart meter of the user and at least one electrical power generating station, a utility controlling power distribution, and the electrical devices of the user. The electrical transaction is at least one of distributing electrical power from a distribution substation to the smart meter of an electricity user, storing electrical power in a storage battery of the at least one user, supplying electrical power by the smart meter from a storage battery of the at least one user to the distribution substation, demanding, by the smart meter, electrical power from the distribution station and delaying an energy transaction between the smart meter and the distribution substation.

In determining the electrical transaction by the controller, the method continues until the non-cooperative multi-periodic smart grid game with shifted demand reaches the Nash equilibrium and obtains a linear objective function for the utility of each agent of the smart grid game.

In another exemplary embodiment, a non-transitory computer readable medium having instructions stored therein that, when executed by one or more processors, causes the one or more processors to perform a method of managing demand side electrical transactions with shifted demand in a smart grid, the method comprising connecting electrical power generating stations, a plurality of smart meters and electric utilities in both a power distribution network and a bidirectional communications network. The method continues by each smart meter and every electric power generating station participating as an agent in a non-cooperative multi-periodic smart grid game with shifted demand for determining an electrical transaction between the smart meter of the user and at least one electrical power generating station, the utility, and the electrical devices of the user. The electrical transaction is at least one of distributing electrical power from a distribution substation to the smart meter of an electricity user, storing electrical power in a storage battery of the at least one user, supplying electrical power by the smart meter from a storage battery of the at least one user to the distribution substation, demanding, by the smart meter, electrical power from the distribution station and delaying an energy transaction between the smart meter and the distribution substation.

In determining the electrical transaction by the controller, the method continues until the non-cooperative multi-periodic smart grid game with shifted demand reaches the Nash equilibrium and obtains a linear objective function for the utility of each agent of the smart grid game.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
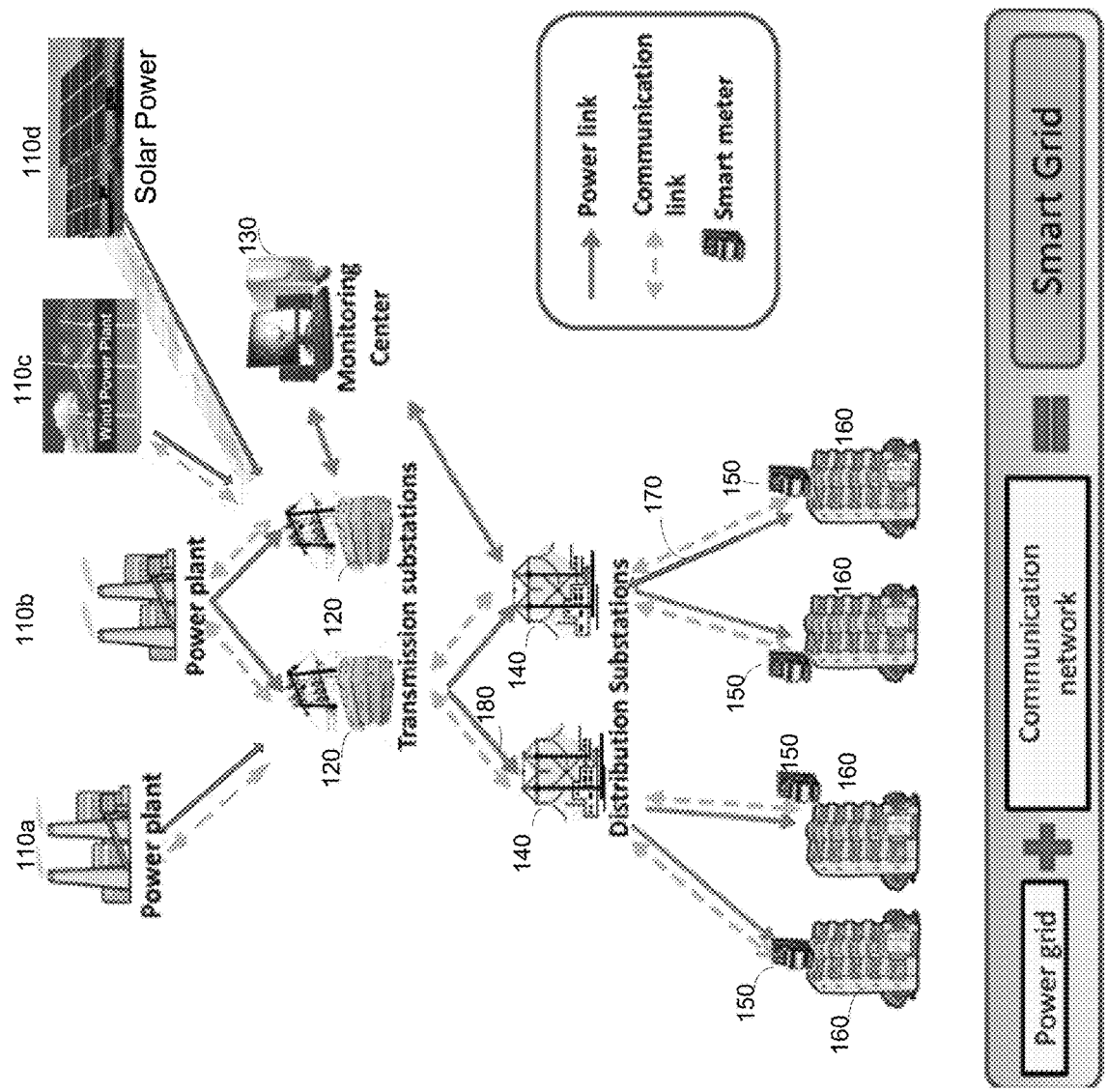
FIG. 1 is a smart grid communication network according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10/a, or preferably 5%, and any values therebetween.

Aspects of the invention are directed to a smart meter system for managing demand side electrical transactions with shifted demand in a smart grid, a method for managing demand side electrical transactions with shifted demand in a smart grid and non-transitory computer readable medium having instructions stored therein that, when executed by one or more processors, cause the one or more processors to perform a method for managing demand side electrical transactions with shifted demand in a smart grid.

In a first aspect, a smart grid has architecture 100, as depicted in FIG. 1, which includes two components, the electric power distribution grid and the communications network. The electric power, which is generated at a power generating station or plant (110a, 110b, 110c, 110d), is supplied to the consumers through transmission substations 120 and distribution substations 140 over power transmission lines (shown as solid arrows in FIG. 1).

The electrical power generating station can be a conventional power generating plant, such as 110a or 110b. A conventional electrical power generating plant in non-limiting examples may be a hydroelectric power plant, a coal-fired power plant, nuclear energy plant, a fossil fuel plant, a petroleum plant, a natural gas plant or a chemical energy plant. A conventional power plant generates electricity by using the energy to rotate a turbine. The power plant may be a renewable energy power generating plant, such as wind power plant 110c, solar power plant 110d or a geothermal energy plant. Any type of electrical power generating plant may be the electrical power generating station or plant of the present invention. Further non-limiting examples of electrical power generating plants are piezoelectric energy generated by wave motion or vehicles passing over piezoelectric plates and fuel cells. A typical power plant will generate three phase power at or over 110 kilovolts, which is transmitted to a transmission substation.

The transmission substation supplies electric power from the power plant over high voltage power transmission lines (usually over 110 kilovolts), an example of which is shown as arrow 180, to the distribution substations 140, which are located at different regions. The distribution substations transform the electric power into medium voltage level, typically less than 10 kilovolts, preferably 7.2 kilovolts, and distribute it to the building-feeders over power line 170.

Figure 2:
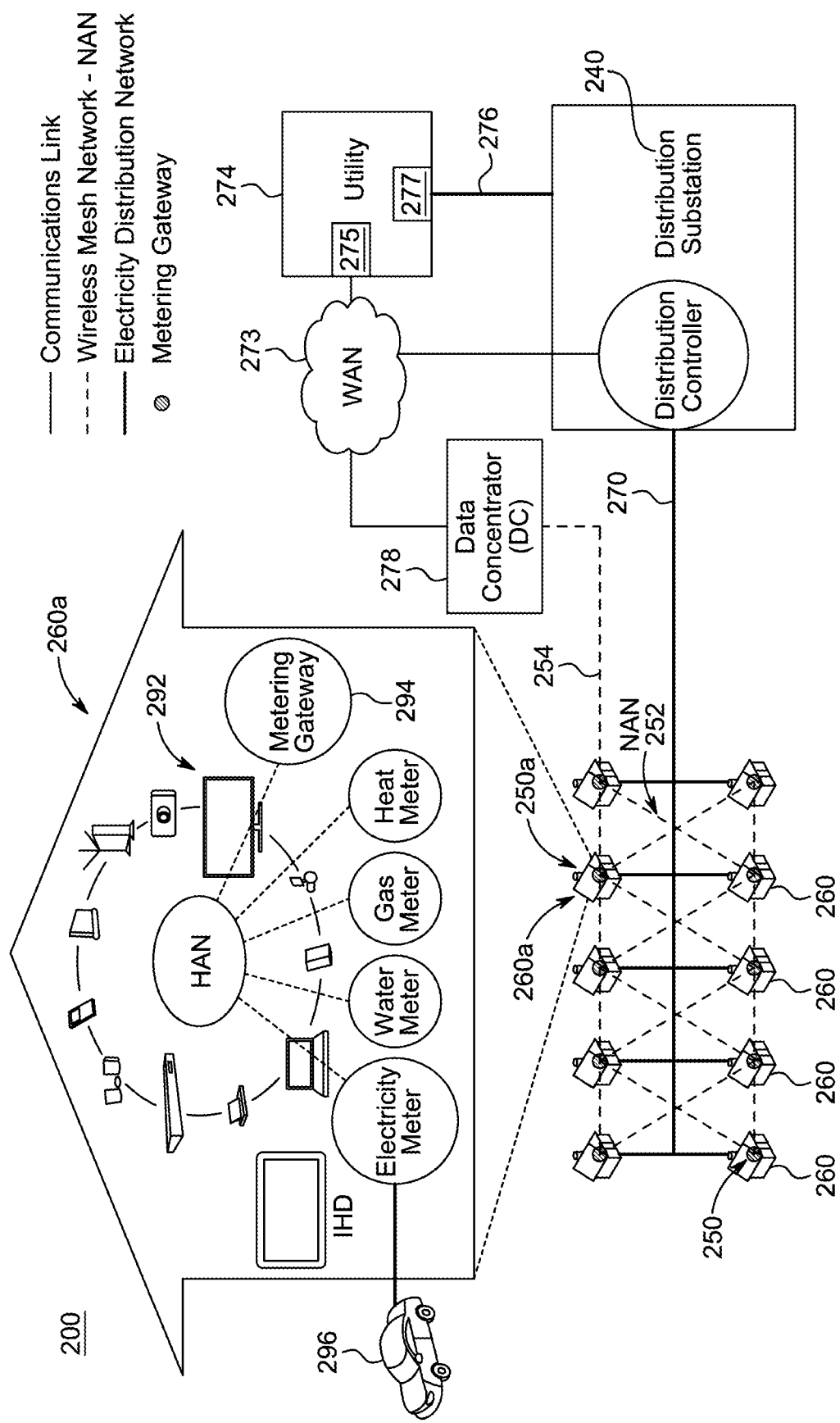
FIG. 2 is an exemplary illustration of an aspect of a multi-tier smart grid communications network with HANs, NANs, and WANs.

As shown in FIG. 1 and FIG. 2, at a distribution substation 240 connected by power cables to a building (160, 260), the voltage is converted by a transformer to provide 110 volt, three phase power to the building, in the United States. The above values for voltage vary by country and type of distribution system, and may be chosen dependent on the smart grid needs and operating specifications. From a communications viewpoint, the monitoring center 130, which may be operated by a utility company or a central authority, communicates with the transmission substations 120 and distribution 140 substations by optical fiber technology, which is the broadband technology most capable of communicating high volume delay sensitive smart grid traffic.

At the home user's side, smart meters 150 installed at each building feeder have both power and communication interfaces. Smart meters 250 are also deployed at individual apartments or homes 260 which in turn can communicate with the building smart meter 150.

Consumers owning a smart meter can determine their consumed electric power and decide to change their consumption levels by running/shutting down user electrical appliances, an example of which is television 292, by communicating with the smart grid system provider, such as utility 274, by using these smart meters. The communication technology used in the smart meter communication is usually considered to be wireless. For example, the communication between the monitoring center 130 and buildings 160, and that between a building and its apartments may be facilitated over wireless broadband technologies such as 3G or WiMax. On the other hand, home appliances communication with a home smart meter 250 can be connected through WiFi or ZigBee technologies. In FIG. 2, a Home Area Network (HAN) is shown as the communication network within a home 260a.

In an embodiment, as shown by FIG. 1 and FIG. 2, a smart meter system 200 for managing demand side electrical transactions with shifted demand in a smart grid 100 is described. The smart meter system is part of a smart grid 100 as shown in FIG. 1. The smart grid includes at least one utility 274, such as a utility grid or utility controlling entity; a power distribution network (indicated by solid arrows in FIG. 1) connected by the smart grid to the at least one utility power distribution node. The utility 274 is connected by power transmission lines 276 to a power distribution substation 240.

A plurality of electricity users, such as buildings 160, houses 260 or apartments are each connected to a smart meter (150, 250). Each smart meter (150, 250) is connected to electrical devices in the building, house or apartment through a metering gateway 294. In a preferred example, the metering gateway connects wirelessly with the electrical devices and with the smart meter. However, some of the electrical devices may be connected to the metering gateway by wiring. For example, in FIG. 2, electrical devices connected to smart meter are shown as a television 292, a vehicle, an electrical storage battery, an electricity meter, a water meter, a gas meter, a heat meter, a computer, a home security system and various other user devices, such as a smart phone, thermostats, and remote controls. Any controllable electric device within the range of the home area network (HAN) shown in FIG. 2 can be wired or wirelessly connected to the smart meter through the metering gateway 294.

The smart meter is connected to the distribution substation by power transmission lines 270.

As shown in FIG. 1, at least one electrical power generating station (110a, 110b, 110c, 110d) is connected to the smart grid. Although four electrical power generating stations are shown in FIG. 1, any electrical power generating station connected into the smart grid can provide electric power to the electric power distribution system.

The smart grid includes a bidirectional communications network (depicted by dotted arrows in FIG. 1) connected between the at least one electrical power generating station, the at least one utility communications node and the at least one smart meter.

A neighborhood area network 252 (NAN) is connected between the smart meter 250a of a first user 260a and each of the other smart meters of the plurality of electricity users and the NAN is connected to a data concentrator 278. The connection between the NAN and the data concentrator may be wired, as shown by bidirectional communication lines 254 or may be wireless.

A wide area network 273 (WAN) is connected between the data concentrator and the at least one utility communications node 275.

The smart meter can advantageously communicate with a plurality of electrical power generating stations to determine the cost of comparable units of electricity and periods of time when costs are higher or lower. The smart meter can also communicate with the utility communications node 275 to determine the remuneration for selling a unit of electricity back to the utility and periods of time when the remuneration is higher or lower. The smart meter 250a can also communicate with other smart meters connected in the neighborhood area network, and can share power stored in electrical storage devices of each building, apartment or home with another smart meter. The smart meters 250 in the neighborhood area network can collectively communicate with the electrical power suppliers to broker deals with the electrical power suppliers.

Figure 3:
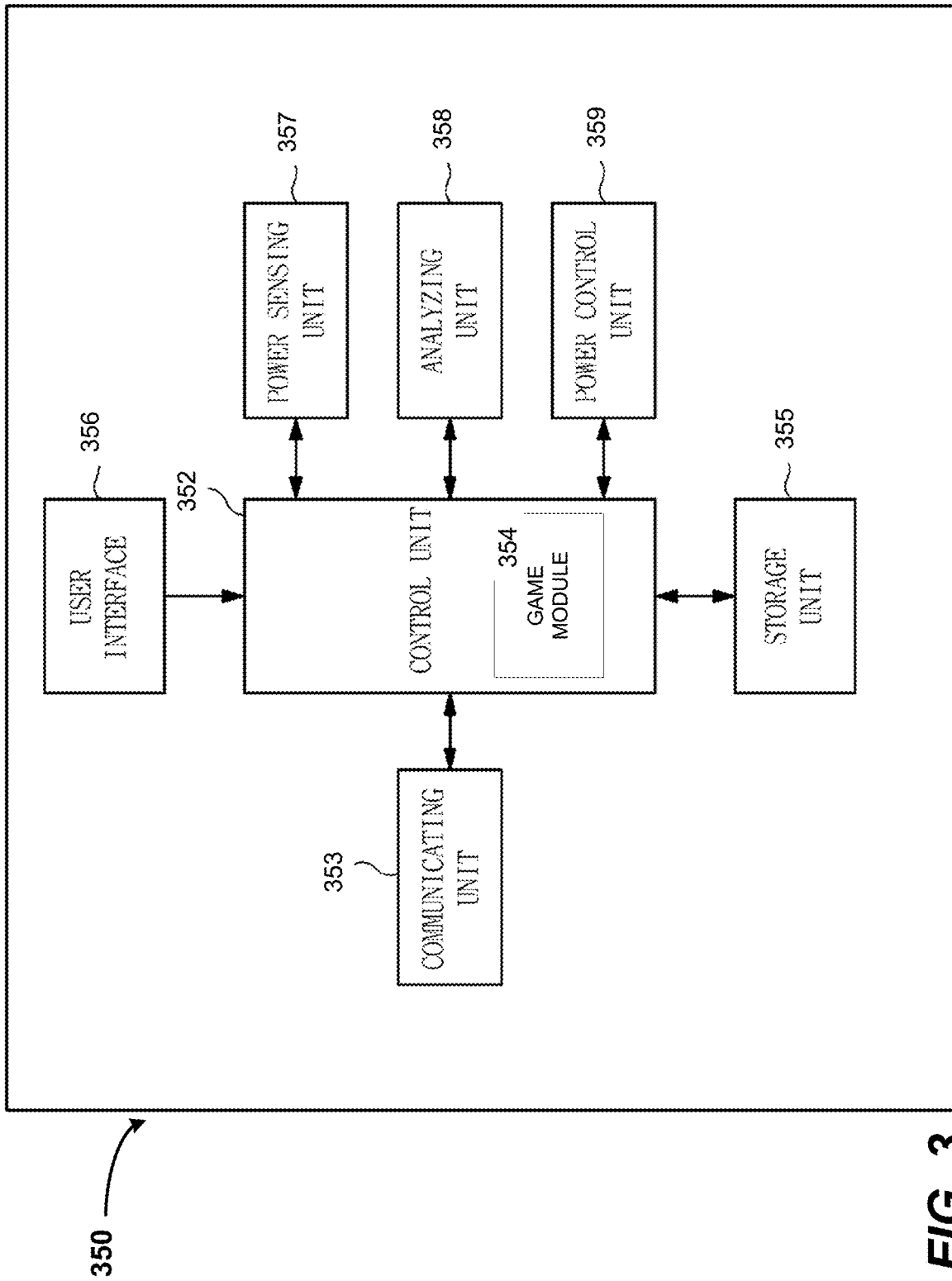
FIG. 3 is a smart meter according to certain embodiments.

Referring now to FIG. 3, each smart meter 350 has a controller 352 including circuitry, shown by Communicating Unit 353, configured to receive data communications from at least one electrical power generating station, the utility communications node 275, and from each other smart meter of the plurality of smart meters 250, wherein the circuitry of each smart meter includes program instructions configured to analyze the data communications (see Analyzing Unit 358) and determine at least one electrical transaction of the smart meter by using a non-cooperative multi-periodic smart grid game with shifted demand (see Game Module 354); and to perform the electrical transaction based on the determination, wherein performing the electrical transaction improves the demand response of each smart meter.

Referring now to FIG. 2 and FIG. 3, the electrical transaction is at least one of distributing electrical power from the distribution substation 240 to the smart meter 250 of an electricity user (see Power Control Unit 359 for receiving and transmitting power), storing electrical power in a storage battery of the at least one user, for example, charging the battery of a hybrid or electric vehicle 296 or storing energy in a storage device of the metering gateway, supplying electrical power by the smart meter from a storage battery of the at least one user to at least one other smart meter in the neighborhood network, supplying electrical power by the smart meter from a storage battery, for example vehicle 296 of the at least one user, to the distribution substation 240, demanding, by the smart meter, electrical power from the distribution station and delaying an energy transaction between the smart meter and the distribution substation.

Delaying an energy transaction comprises at least one of delaying the reception of electrical power until a time period when a cost of a unit of electricity is lower than the cost of the unit of electricity in a current time period and delaying the distribution of electrical power from the electricity user to an electrical power generating station until a sales price of a unit of electricity is higher than a sales price of the unit of electricity in a current time period.

The controller of the smart meter analyzes the data communications as mentioned above. The controller is able to sense the power needs of the electrical devices of the user, communicate with the utility through its communications node 275 and the electrical power generating stations and other smart meters and analyze this information in the Game Module 355. The controller of the smart meter is designated as an agent of the non-cooperative multi-periodic smart grid game with shifted demand. The game is "played" until the Nash equilibrium is reached and a linear objective function is obtained for the utility of each agent of the smart grid game. The analysis and method for using the non-cooperative multi-periodic smart grid game with shifted demand is described below.

The determination of an electrical transaction or a series of electrical transactions can serve to provide demanded electrical power to each electricity user while minimizing the power costs of each electricity user. Furthermore, the determination can be to optimize utility power transactions. Additionally, the determination can optimize transactions between the smart meter and a plurality of electrical power generating stations, such as by enabling the smart meter to determine the comparative costs of a unit of electrical power from a plurality of electrical power generating stations and choose to receive the electrical power from the electrical power generating station (or electrical power provider) offering the lowest cost. The lowest cost may be offered at delayed time of day and the smart meter of the user can order the lowest cost electrical power to be delivered at the delayed time of day. This feature may be advantageous for owners of hybrid or electric vehicles, who may wish to charge their vehicles at night.

The determination of the electrical transaction may be to sell electricity to the utility at a time when the sales price is highest. The electricity user may have energy generating devices, such as fuel cell electrical generators, nuclear powered energy generators, hybrid or electric vehicles, solar panels, or an electric generator. This excess electrical power may be sold to the utility at a time when the sales price is highest. The sale of this electrical power may offset the user's overall electric power costs or may even generate revenue for the user.

The plurality of smart meters connected by the NAN each participate as agents in the non-cooperative multi-periodic smart grid game with shifted demand. The game is non-cooperative because each agent optimizes the utility costs of its user without regard to the other agents. However, the agents of the smart meters may cooperate as a group to obtain lower prices per unit of electricity from an electrical power generating station under a volume buying protocol. A unit of electrical power is then purchased as demanded by each agent through the utility. A unit of electrical power may be a watt or a kilowatt of power.

The determination of the transaction may be for a smart meter user which has an excess of stored energy to sell the stored energy to another smart meter user at a lower price than offered by the electric power generating stations, at price competitive with that offered by the electric power generating stations, or at a more advantageous time.

In a further embodiment, the power generating stations may each have a controller including circuitry having program instructions analyze power needs and data communications with the utility and each of the smart meters and act as an agent in the non-cooperative smart grid game with shifted demand to reach a Nash equilibrium, wherein reaching the Nash equilibrium optimizes transactions between the electrical power generating station and the plurality of smart meters to the benefit of the electrical power generating station.

In another embodiment, a method of managing demand side electrical transactions with shifted demand in a smart grid is described with respect to FIGS. 1, 2 and 3, the method comprising connecting, for each of a plurality of electricity users, at least one smart meter 250 of each electricity user 260 to at least one electrical device, for example, television 292 or vehicle 296 of the electricity user; connecting a power distribution network (as shown by single sided arrows in FIG. 1) to a utility 274 associated with the plurality of electricity users; connecting at least one electrical power generating station (110a, 110b, 110c, 110d) to the power distribution network; providing, by the electrical power generating station, electrical power through the power distribution network to the utility power distribution node 277.

The method continues by connecting first power transmission lines 276 of the utility to a distribution substation 240; connecting second power transmission lines 270 of the distribution substation to each smart meter 250 of the plurality of electricity users 260; connecting a bidirectional communications network (note dotted and/or double sided arrows in FIG. 1) to each smart meter 250, the utility 274 communications node 275 and the at least one electrical power generating station 110; connecting a neighborhood area network 252 (NAN) between each of the smart meters of the plurality of electricity users, the NAN connected to a data concentrator 278; connecting a wide area network 273 (WAN) between the data concentrator 278 and the at least one utility communications node 275.

The method continues by each smart meter receiving data communications from at least one electrical power generating station 110, the utility 274, and from each other smart meter 250 of the plurality of smart meters; and, by a controller 352 of each smart meter, the controller having circuitry including program instructions configured for analyzing the data communications, determining at least one electrical transaction of the smart meter by using a non-cooperative multi-periodic smart grid game with shifted demand (as shown by Game Module 354); and performing the electrical transaction based on the determination.

The electrical transaction is at least one of distributing electrical power from at least one distribution substation to the smart meter of an electricity user, storing electrical power in a storage battery of the at least one user, supplying electrical power by the smart meter from a storage battery of the at least one user to at least one other smart meter in the neighborhood network, supplying electrical power by the smart meter from a storage battery of the at least one user to the distribution substation, demanding, by the smart meter, electrical power from the distribution station and delaying an energy transaction between the smart meter and the distribution substation.

The method further comprises analyzing the data communications using the non-cooperative multi-periodic smart grid game with shifted demand until reaching a Nash equilibrium, wherein reaching a Nash equilibrium provides demanded electrical power to each electricity user while minimizing the electrical power costs of each electricity user.

The method additionally comprises analyzing the data communications using the non-cooperative multi-periodic smart grid game with shifted demand until reaching a Nash equilibrium, wherein reaching the Nash equilibrium optimizes the utility power transactions between at least one of the utility and the distribution substation and the utility and at least one power generating station.

In a further embodiment of the method, the method comprises receiving, by each electrical power generating station, each electrical power generating station having a controller including circuitry configured to receive data communications, data communications from each smart meter. The method continues by analyzing, by the controller of each energy provider, the controller of each electrical power generating station having circuitry including program instructions configured for analyzing, the data communications from each smart meter; determining, by the controller, at least one electrical transaction of the electrical power generating station by using a non-cooperative smart grid game with shifted demand to reach the Nash equilibrium; maximizing transactions between the electrical power generating station and the plurality of smart meters based on the determining of the Nash equilibrium.

The method continues by reaching the Nash equilibrium by obtaining a linear objective function for the utility of each agent of the smart grid game with shifted demand.

For the methods above, delaying an energy transaction comprises at least one of delaying the reception of demanded electrical power until a time period when a cost of a unit of electricity is lower than the cost of the unit of electricity in a current time period and delaying the distribution of electrical power from the electricity user to an electricity provider until a sales price of a unit of electricity is higher than a sales price of the unit of electricity in a current time period; and distributing demanded electrical power to each smart meter as needed while taking into account the comparative advantage of shifting demand by delaying consumption to later periods of time.

The method continues by at least one of receiving, by a plurality of smart meters, electricity from a utility connected to the smart grid; supplying electrical power by the smart meter from a storage battery of the at least one user to at least one other smart meter in the neighborhood network, supplying, by a plurality of smart meters, electricity to a distribution substation connected to a utility connected to the smart grid; supplying, by at least one power generating station, electricity to at least one utility connected to the smart grid and receiving, by at least one power generating station, electricity from at least one utility connected to the smart grid.

In a further exemplary embodiment, a non-transitory computer readable medium having instructions stored therein that, when executed by one or more processors, causes the one or more processors to perform a method of managing demand side electrical transactions with shifted demand in a smart grid is disclosed.

The non-transitory computer readable medium method, is described with respect to FIGS. 1, 2, and 3 further comprises: connecting, for each of a plurality of electricity users 260, at least one smart meter 250 of each electricity user to at least one electrical device, for example, television 292 or vehicle 296 of the electricity user, connecting a power distribution network (as shown by single sided arrows in FIG. 1) to a utility 274 having a power distribution node 277 associated with the plurality of electricity users; connecting at least one electrical power generating station (110*a*, 110*b*, 110*c*, 110*d*) to the power distribution network; providing, by the electrical power generating station, electrical power through the power distribution network to the utility power distribution node 277; connecting first power transmission lines 276 of the utility to a distribution substation 240; connecting second power transmission lines 270 of the distribution substation to each smart meter 250 of the plurality of electricity users 260; connecting a bidirectional communications network (note dotted and/or double sided arrows in FIG. 1) to each smart meter 250, a utility 274 communications node 275 and the at least one electrical power generating station 110; connecting a neighborhood area network 252 (NAN) between each of the smart meters of the plurality of electricity users, the NAN connected to a data concentrator 278; connecting a wide area network 273 (WAN) between the data concentrator 278 and the at least one utility 274.

The non-transitory computer readable medium method further comprises receiving data communications from at least one electrical power generating station 110, the utility 274, and from each other smart meter 250 of the plurality of smart meters; and, by a controller 352 of each smart meter, the controller having circuitry including program instructions configured for analyzing the data communications, determining at least one electrical transaction of the smart meter by using a non-cooperative multi-periodic smart grid game with shifted demand (as shown by Game Module 354); and performing the electrical transaction based on the determination; acting, by the controller 352 of each smart meter, as an agent in the non-cooperative multi-periodic smart grid game with shifted demand and obtaining a linear objective function for the utility of each agent of the game with shifted demand; performing the electrical transaction based on the determining, wherein performing the electrical transaction improves the demand response of each smart meter.

The electrical transaction is at least one of distributing electrical power from at least one distribution substation 240 to the smart meter of an electricity user, storing electrical power in a storage battery, such as in a battery of a hybrid electric vehicle 296 of the at least one user, supplying electrical power by the smart meter from a storage battery of the at least one user to at least one other smart meter in the neighborhood network, supplying electrical power by the smart meter from a storage battery of the at least one user to the distribution substation 240, demanding, by the smart meter, electrical power from the distribution station and delaying an energy transaction between the smart meter and the distribution substation.

Analyzing the data communications using the non-cooperative multi-periodic smart grid game with shifted demand further comprises reaching a Nash equilibrium, wherein reaching the Nash equilibrium provides demanded electrical power to each electricity user while minimizing the electrical power costs of each electricity user, optimizes the utility power transactions between at least one of the utility and the distribution substation and the utility and at least one power generating station.

The non-transitory computer readable medium method continues by receiving, by each electrical power generating station 110, each electrical power generating station having a controller including circuitry configured to receive data communications, data communications from each smart meter 250; analyzing, by the controller of each energy provider 110, the controller of each electrical power generating station having circuitry including program instructions configured for analyzing, the data communications from each smart meter, determining, by the controller, at least one electrical transaction of the electrical power generating station by using a non-cooperative smart grid game with shifted demand to reach a Nash equilibrium; and maximizing transactions between the electrical power generating station and the plurality of smart meters based on the determining of the Nash equilibrium.

In the above embodiments, the processing of the smart grid game is done by the controller of each smart meter. However, the invention is not limited to processing on the smart meter. The processing may be distributed across a plurality of computers. Further, the game may be processed at a website or a web application accessed by each smart meter or electrical power generating station.

The smart meter system is an example of an advanced metering system. Advanced metering systems are comprised of state-of-the-art electronic/digital hardware and software, which combine interval data measurement with continuously available remote communications. These systems enable measurement of detailed, time-based information and frequent collection and transmittal of such information to various parties. In some embodiments, a smart grid is an example of an Advanced Metering Infrastructure (AMI), which typically refers to the full measurement and collection system that includes meters at the customer site, communication networks between the customer and a service provider, such as an electric, gas, or water utility, and data reception and management systems that make the information available to the service provider.

Figure 4:
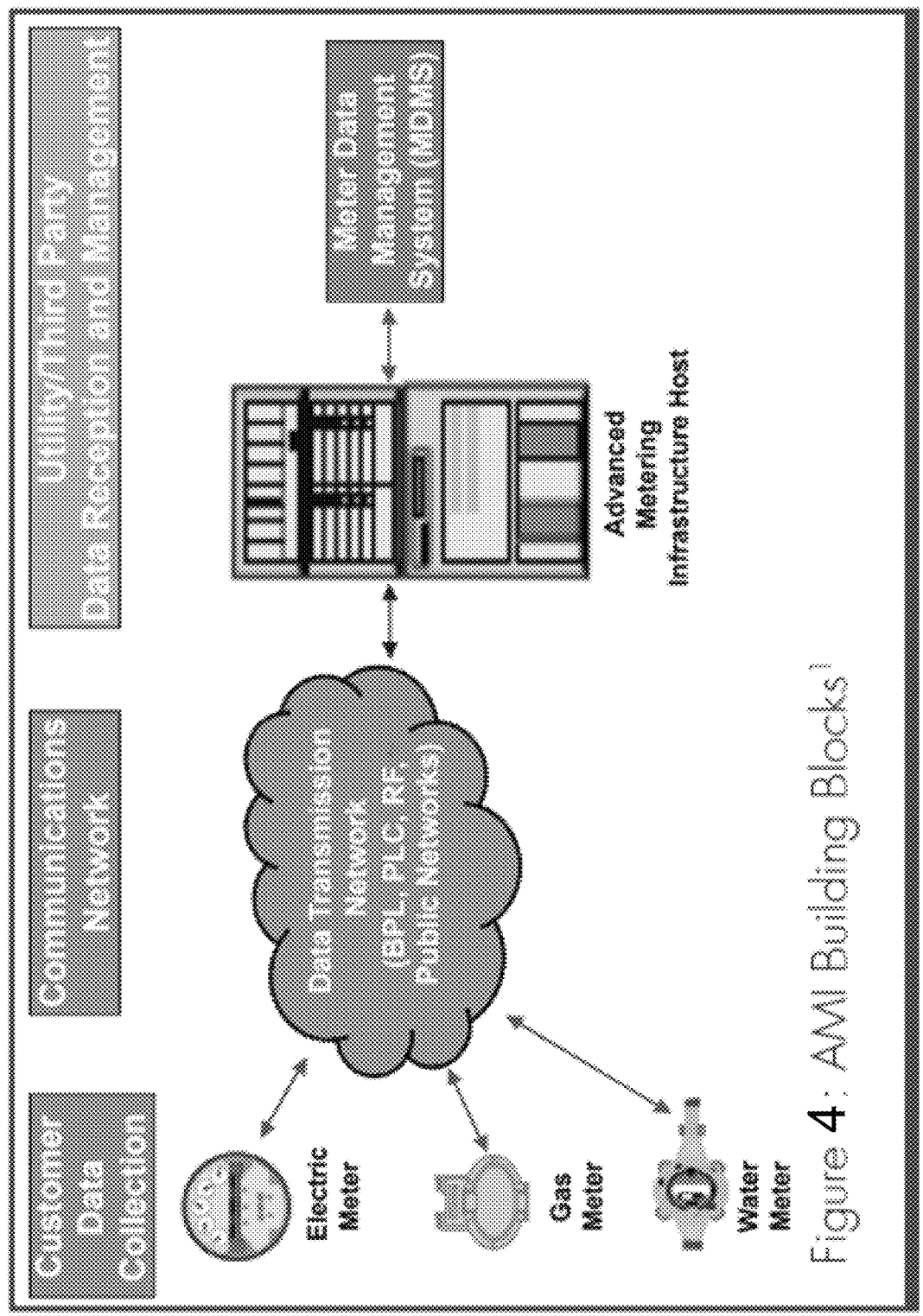
FIG. 4 is a smart grid advanced metering system according to certain embodiments.

FIG. 4 shows the building blocks of an AMI. The customer is equipped with advanced solid state, electronic meters that collect time-based data. Meters include all three types, electricity, gas, and water meters. These meters have the ability to transmit the collected data through commonly available fixed networks such as Broadband over Power Line (BPL), Power Line Communications (PLC), Fixed Radio Frequency (RF) networks, and public networks (e.g., landline, cellular, paging). The meter data are received by the AMI host system and sent to the Meter Data Management System (MDMS) that manages data storage and analysis to provide the information in useful form to the utility. AMI enables two-way communications, so communication from the utility to the meter also takes place.

Figure 5:
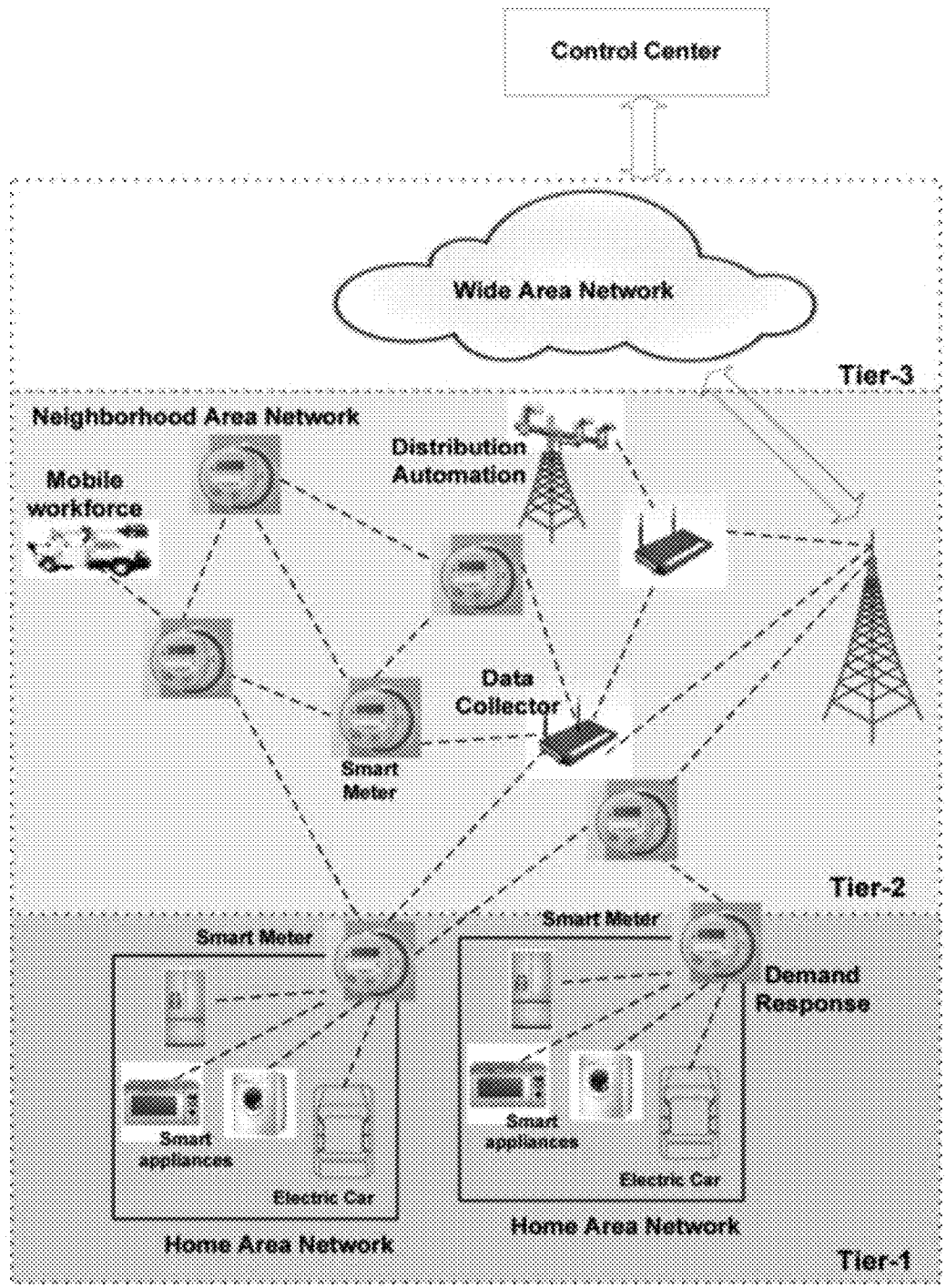
FIG. 5 is an exemplary illustration of an overview of a multi-tier smart grid communications network with HANs, NANs, and WANs.

FIG. 5 illustrates the multitier structure for a smart grid. In Tier-1 each smart meter interconnects (either wirelessly or via Ethernet connection) several smart appliances inside the house. Tier-2 neighborhood area network (NAN) interconnects the smart meters via a mesh network that facilitates reliable and fast interconnection among many AMIs. Tier-3 represents a wide range of network technologies that connect energy provider/retailers with the Tier-2 NAN.

With the advancement of smart grid technologies, large-scale implementation of variable-rate metering has become important. As a result, consumers are able to control their electricity consumption in an automated fashion, where each individual maximizes its own utility as a non-cooperative game. In the present invention, non-cooperative games are formulated among Smart Grid electricity users and electricity providers with real-time pricing schemes, in which the Nash equilibrium operational points are determined for load balancing.

A Nash equilibrium is defined as a situation where the plurality of electricity users and the plurality of providers simultaneously maximize their individual utility functions over consecutive periods of time (T).

An agent-based multi-periodic non-cooperative game theoretic model for electricity consumption and storage for residential and industrial demand response is disclosed as discussed above/below. In the non-cooperative game, electricity storage is distributed to electricity users as needed while taking into account the comparative advantage of delaying consumption to later periods. This is called shifted demand. Shifting demand results in lower demand peaks on the smart grid while utility optimization is kept as the main target for each agent. In the game of the present invention, it is assumed that the electricity user's demand can be shifted from one period to another. It is also assumed that electricity users can produce, store energy or sell energy back to the providers. The main goal of the game theoretical model of the present invention is to maximize each agent utility function, while satisfying electricity user's and provider's interaction conditions.

Table I defines the parameters, the variables and the utility functions used in the formulation. In Table I, the variable $f_i^t$ represents the demand of electricity user i satisfied during period t. The variable $h_i^t$ represents the demand of electricity user i shifted to period t+1. The variable $p_i^t$ represents the quantity of energy electricity user i produces during period t. The variable $s_i^t$ represents the quantity of energy electricity user i stores during period t. The variable $x_{ij}^t$ represents the quantity of energy electricity user i sends to electrical power generating station j during period t. Similarly, The variable $p_j^t$ represents the quantity of energy electrical power generating station j produces during period t. The variable $s_j^t$ represents the quantity of energy electrical power generating station j stores during period t. The variable $y_{ij}^t$ represents the quantity of energy electrical power generating station j sends to electricity user i during period t. The vector $X_i^t = (x_i^t, f_i^t, h_i^{t+1}, p_i^t, s_i^t)$ represents all the variables controlled by electricity user i for a given period t. In the same way, the vector $Y_j^t = (y_j^t, p_j^t, s_j^t)$ represents all the variables controlled by electrical power generating station j for a given period t. The two vectors and $X_i^t$ and $Y_i^t$ do not represent proportions of demands but real quantities.

The parameter $D_i^t$ represents the demand of electricity user i for period t. The parameters $L_i^t$ and $L_j^t$ represent the distribution capacities of electricity user i and electrical power generating station j for period t, respectively. The parameters $C_i^t$ and $C_j^t$ represent the storage capacities of electricity user i and electrical power generating station j for period t, respectively. The parameters $K_i^t$ and $K_j^t$ represent the production capacities of electricity user i and electrical power generating station j for period t, respectively.

A Nash equilibrium is a situation where agents simultaneously maximize their individual payoffs. Each agent has no interest in deviating from its equilibrium strategy. For the inventive multi-periodic smart grid game with shifted demand, Nash equilibrium is defined as a situation where n electricity users and m electrical power generating stations simultaneously maximize their individual utility functions over T consecutive periods of time. Any game has at least one Nash equilibrium, possibly in mixed strategies. In the present disclosure, considering that the overall demand of the electricity user is not able to be met over the T consecutive periods, the unsatisfied demand for every electricity user i would appear as a shifted demand $h_i^{T+1}$.

TABLE I

Parameter, variables and utility functions

| | Type | Description |
|---|---|---|
| Variable | | |
| $f_i^t$ | Real | Demand of i satisfied at t; |
| $h_i^t$ | Real | Demand of i shifted to t; |
| $p_i^t$ | Real | Quantity i produces at t; |
| $s_i^t$ | Real | Quantity i stores at the end of t; |
| $x_{ij}^t$ | Real | Quantity i sends to j at t; |
| $x_i^t$ | Vector | Quantities i sends to all providers at t; |
| $X_i^t$ | Vector | All decision variables controlled by i at t; |
| $p_j^t$ | Real | Quantity j produces at t; |
| $s_j^t$ | Real | Quantity j stores at the end of t; |
| $y_{ij}^t$ | Real | Quantity i receives from j at t; |
| $y_j^t$ | Vector | Quantities i receives from all providers at t; |
| $Y_j^t$ | Vector | All decision variables controlled by j at t; |
| Parameter | | |
| $D_i^t$ | Real | Demand of i at t; |
| $L_i^t$ | Real | Distribution capacity of i at t; |
| $L_j^t$ | Real | Distribution capacity of j at t; |
| $C_i^t$ | Real | Storage capacity of i at t; |
| $C_j^t$ | Real | Storage capacity of j at t; |
| $K_i^t$ | Real | Production capacity of i at t; |
| $K_j^t$ | Real | Production capacity of j at t; |
| Function | | |
| $U_{ij}^t(X_i^t, Y_j^t)$ | Real | utility of i at t with respect to j; |
| $V_{ij}^t(X_i^t, Y_j^t)$ | Real | utility of j at t with respect to i; |

In the following, it is assumed that the utility 274 of each electricity user 260 or electrical power generating station 110, is additive with respect to all partial utilities they get by interaction with electrical power generating stations or electricity users respectively. The definition of Nash equilibrium for the defined multi-periodic smart grid game with shifted demand can thus be derived.

Definition 1: For the multi-periodic smart grid game with shifted demand (MPSGSD), a Nash equilibrium at time t is a vector of strategies, $$(\hat{X}_1^t, \ldots, \hat{X}_i^t, \ldots, \hat{X}_n^t, \hat{Y}_1^t, \ldots, \hat{Y}_m^t)_{t=1}^T$$

such that, for each electricity user i and for each electrical power generating station j respectively, there is:

$$\hat{X}_i^t \in \underset{X_i^t}{\operatorname{argmax}} \sum_{t=1}^T \sum_{j=1}^m U_{ij}^t(X_i^t, Y_j^i)$$

subject to:

$$f_i^t + s_i^t + \sum_{j=1}^m x_{ij}^t = p_i^t + s_i^{t-1} + \sum_{j=1}^m y_{ij}^t, \forall t, \quad (1)$$

$$h_i^{t+1} + f_i^t = h_i^t + D_i^t, \forall t, \quad (2)$$

$$\sum_{j=1}^m x_{ij}^t \le L_i^t, \forall t, \quad (3)$$

$$p_i^t \le K_i^t, \forall t, \quad (4)$$

$$s_i^t \le C_i^t, \forall t, \quad (5)$$

$$s_i^0 = 0, s_i^T = 0, h_i^1 = 0, \quad (6)$$

$$X_i^t \ge 0, \forall t, \quad (7)$$

and $$\hat{Y}_j^t \in \underset{Y_j^t}{\operatorname{argmax}} \sum_{t=1}^T \sum_{i=1}^n V_{ij}^t(X_i^t, Y_j^t)$$

subject to $$p_j^t + s_j^{t-1} + \sum_{i=1}^n x_{ij}^t = s_j^t + \sum_{i=1}^n y_{ij}^t, \forall t, \quad (8)$$

$$\sum_{i=1}^n y_{ij}^t \le L_j^i, \forall t, \quad (9)$$

$$p_j^t \le K_j^t, \forall t, \quad (10)$$

$$s_j^t \le C_j^t, \forall t, \quad (11)$$

$$s_j^0 = 0, s_j^T = 0, \quad (12)$$

$$Y_j^t \ge 0, \forall T. \quad (13)$$

with $$X_i^t = (x_{i,}^t, f_i^t, h_i^{t+1}, p_i^t, s_i^t) \text{ and } Y_j^t = (y_j^t, p_j^t, s_j^t).$$

For each electricity user i, constraint (1) is a flow conservation constraint stating that the sum of the quantities received, stored or produced by electricity user i at the beginning or during period t equals the sum of the quantities sent, consumed or stored by electricity user i during or at the end of the given period. Constraint (2) states that the sum of the consumption of electricity user i during period t and the demand shifted to the next period t+1 equals the demand of electricity user i for the period t and the demand shifted from the previous period t−1. Constraint (3) states that the sum of all the quantities sent by electricity user i during period t cannot exceed the distribution capacity of electricity user i. Constraint (4) states that the quantity produced by electricity user i during t cannot exceed the production capacity of electricity user i for the given period. Constraint (5) states that the quantity stored by i during t cannot exceed the storage capacity of electricity user i. Constraint (6) states that the quantities stored by i at the beginning of period 1 and the end of period T, and the demand shifted initially to period 1 are zero. Constraint (7) states that all decision variables controlled by electricity user i are non-negative.

For each electrical power generating station j, constraint (8) is a flow conservation constraint stating that the sum of the quantities received, stored or produced by electrical power generating station j at the beginning or during period t equals the sum of the quantities electrical power generating station j sent or stored during, or at the end of the given period. Constraint (9) states that the sum of all the quantities sent by electrical power generating station j during period t cannot exceed the distribution capacity of electrical power generating station j. Constraint (10) states that the quantity produced by j during t cannot exceed the production capacity of the electrical power generating station for the given period. Constraint (11) states that the quantity stored by electrical power generating station j during t cannot exceed its storage capacity. Constraint (12) states that the quantities stored by electrical power generating station j at the beginning of period 1 and the end of period T are zero. Constraint (13) states that all decision variables controlled by electrical power generating station j are non-negative.

A. Linear Programming Formulation

Bringing to the right side all the variables controlled by a given player for a given period t, the mathematical programs in definition 1 could be rewritten as follows:

$$(\mathcal{P}_i^t): \max_{X_i^t} \sum_{t=1}^{T} \sum_{j=1}^{m} U_{ij}^t(X_i^t, Y_j^t)$$

subject to $$f_i^t + s_i^t - s_i^{t-1} - p_i^t + \sum_{j=1}^{m} x_{ij}^t = \sum_{j=1}^{m} y_{ij}^t, \forall t, \quad (1)$$

$$h_i^{t+1} + f_i^t = h_i^t + D_i^t, \forall t, \quad (2)$$

$$\sum_{j=1}^{m} x_{ij}^t \le L_i^t, \forall t, \quad (3)$$

$$p_i^t \le K_i^t, \forall t, \quad (4)$$

$$s_i^t \le C_i^t, \forall t, \quad (5)$$

$$s_i^0 = 0, s_i^T = 0, h_i^1 = 0, \quad (6)$$

$$X_i^t \ge 0, \forall t, \quad (7)$$

and $$(\mathcal{P}_j^t): \max_{Y_j^t} \sum_{t=1}^{T} \sum_{i=1}^{n} V_{ij}^t(X_i^t, Y_j^t)$$

subject to:

$$s_j^t - s_j^{t-1} - p_j^t + \sum_{i=1}^{n} y_{ij}^t = \sum_{i=1}^{n} x_{ij}^t, \forall t, \quad (8)$$

$$\sum_{i=1}^{n} y_{ij}^t \le L_j^t, \forall t, \quad (9)$$

$$p_j^t \le K_j^t, \forall t, \quad (10)$$

$$s_j^t \le C_j^t, \forall t, \quad (11)$$

$$s_j^0 = 0, s_j^T = 0. \quad (12)$$

$$Y_j^t \ge 0, \forall t. \quad (13)$$

It is assumed that the utility functions are linear. A linear objective function is obtained for the utility of each agent of the smart grid game with shifted demand.

Assumption 1: For each electricity user i, the utility function with respect to each electrical power generating station j is such that:

$$U_{ij}^t(X_i^t) = a_i^{tf} f_i^t + a_i^{ts} s_i^t + a_i^{tp} p_i^t + a_i^{th} h_i^{t+1} + a_{ij}^{tx} x_{ij}^t.$$

For each electrical power generating station j, the utility function with respect to each electricity user i is such that:

$$V_{ij}^t(Y_j^t) = a_j^{ts} s_j^t + a_j^{tp} p_j^t + a_{ij}^{ty} y_{ij}^t,$$

where $a_i^t$ is the utility of variable (·) of electricity user i at t, and $a_j^t$ is the utility of variable (·) of electrical power generating station j at t.

Following assumption 1, the definition of a Nash equilibrium for the smart grid demand response game with shifted demand can now be formally stated using linear programming.

Definition 2: For the MPSGSD, Nash equilibrium: $(\hat{X}_1^t, \ldots, \hat{X}_n^t, \hat{Y}_1^t, \ldots \hat{Y}_m^t)$ is a vector of strategies, $$(\hat{X}_1^t, \ldots, \hat{X}_n^t, \hat{Y}_1^t, \ldots \hat{Y}_m^t)_{t=1}^T,$$

such that, for each electricity user i and for each electrical power generating station j respectively, there is:

$$\hat{X}_i^t \in \underset{X_i^t}{\operatorname{argmax}} \sum_{t=1}^{T} \sum_{j=1}^{m} a_i^{tf} f_i^t + a_i^{ts} s_i^t + a_i^{tp} p_i^t + a_i^{th} h_i^{t+1} + a_{ij}^{tx} x_{ij}^t$$

subject to $$f_i^t + s_i^t - s_i^{t-1} - p_i^t + \sum_{j=1}^{m} x_{ij}^t = \sum_{j=1}^{m} y_{ij}^t, \forall t. \quad (1)$$

$$h_i^{t+1} + f_i^t = h_i^t + D_i^t, \forall t, \quad (2)$$

$$\sum_{j=1}^{m} x_{ij}^t \le L_i^t, \forall t, \quad (3)$$

$$p_i^t \le K_i^t, \forall t, \quad (4)$$

$$s_i^t \le C_i^t, \forall t, \quad (5)$$

$$s_i^0 = 0, s_i^T = 0, h_i^1 = 0, h_i^{T+1} = 0, \quad (6)$$

$$X_i^t \ge 0, \forall t, \text{ and} \quad (7)$$

$$\hat{Y}_j^t \in \underset{Y_j^t}{\operatorname{argmax}} \sum_{t=1}^{T} \sum_{i=1}^{n} a_j^{ts} s_j^t + a_j^{tp} p_j^t + a_{ij}^{ty} y_{ij}^t$$

subject to $$s_j^t - s_j^{t-1} - p_j^t + \sum_{i=1}^{n} y_{ij}^t = \sum_{i=1}^{n} x_{ij}^t, \forall t, \quad (8)$$

$$\sum_{i=1}^{n} y_{ij}^t \le L_j^t, \forall t, \quad (9)$$

$$p_j^t \le K_j^t, \forall t, \quad (10)$$

$$s_j^t \le C_j^t, \forall t, \quad (11)$$

$$s_j^0 = 0, s_j^T = 0, \quad (12)$$

$$Y_j^t \ge 0, \forall t. \quad (13)$$

For each electricity user i and for each electrical power generating station j respectively, the following dual programs are obtained:

$$(\mathcal{D}_i^t): \min_{\alpha_i^t, \omega_i^t, \beta_i^t, \gamma_i^t, \lambda_i^k} \sum_{t=1}^{T} a_i^t \left( \sum_{j=1}^{m} y_{ij}^t \right) + \beta_i^t (h_i^t + D_i^t) + \omega_i^t L_i^t + \gamma_i^t K_i^t + \lambda_i^t C_i^t$$

subject to $$\alpha_i^t + \beta_i^t \ge a_i^{tf}, \forall t,$$

$$\alpha_i^t - \alpha_i^{t+1} + \lambda_i^t \ge a_i^{ts}, \forall t,$$

$$-\alpha_i^t + \gamma_i^t \ge a_i^{tp}, \forall t,$$

-continued $a_i^t + \omega_i^t \geq a_{ij}^{tx}, \forall j, t,$ $\beta_i^{t-1} - \beta_i^t \geq a_i^{th}, \forall t,$ $a_i^t, \beta_i^t \text{ free}, \omega_i^t, \gamma_i^t, \lambda_i^t \geq 0,$ and $(\mathcal{D}_j^t): \min_{a_j^t, \omega_j^t, \gamma_j^t, \lambda_j^t} \sum_{t=1}^{T} \alpha_j^t \left( \sum_{i=1}^{n} x_{ij}^t \right) + \omega_j^t L_j^t + \gamma_j^t K_j^t + \lambda_j^t C_j^t$ subject to $a_j^t - a_j^{t+1} + \lambda_j^t \geq a_j^{ts}, \forall t,$ $-a_j^t + \gamma_j^t \geq a_j^{tp}, \forall t,$ $a_j^t + \omega_j^t \geq a_{ij}^{ty}, \forall i, t,$ $a_j^t$ free, $\omega_j^t, \gamma_j^t, \lambda_j^t \geq 0.$ Hence, using dual linear programming, Nash equilibrium for the smart grid with shifted demand game can be stated as follows:

Definition 3: Given an MPSGSD, for each Nash equilibrium $(\hat{X}_1^t, \ldots, \hat{X}_n^t, \hat{Y}_1^t, \ldots \hat{Y}_m^t)_{t=1}^T,$ there exists at each t, for each electricity user i, at least one appropriate vector:

$(\hat{\alpha}_i^t, \hat{\omega}_i^t, \hat{\beta}_i^t, \hat{\gamma}_i^t, \hat{\lambda}_i^t),$ and, for each electrical power generating station j, there exists at least one appropriate vector:

$(\hat{\alpha}_j^t, \hat{\gamma}_j^t, \hat{\lambda}_j^t)$ such that, for each electricity user i and for each electrical power generating station j respectively:

$(\mathcal{D}_i^t): \min_{\alpha_i^t, \omega_i^t, \beta_i^t, \gamma_i^t, \lambda_i^t} \sum_{t=1}^{T} \alpha_i^t \left( \sum_{j=1}^{m} y_{ij}^t \right) + \beta_i^t (h_i^t + D_i^t) + \omega_i^t L_i^t + \gamma_i^t K_i^t + \lambda_i^t C_i^t$ subject to $a_i^t + \beta_i^t \geq a_i^{tf}, \forall t,$ $a_i^t - a_i^{t+1} + \lambda_i^t \geq a_i^{ts}, \forall t,$ $-a_i^t + \gamma_i^t \geq a_i^{tp}, \forall t,$ $a_i^t + \omega_i^t \geq a_{ij}^{tx}, \forall j, t,$ $\beta_i^{t-1} - \beta_i^t \geq a_i^{th}, \forall t,$ $a_i^t, \beta_i^t$ free, $\omega_i^t, \gamma_i^t, \lambda_i^t \geq 0,$ and $(\mathcal{D}_j^t): \min_{a_j^t, \omega_j^t, \gamma_j^t, \lambda_j^t} \sum_{t=1}^{T} \alpha_j^t \left( \sum_{i=1}^{n} x_{ij}^t \right) + \omega_j^t L_j^t + \gamma_j^t K_j^t + \lambda_j^t C_j^t$ subject to $a_j^t - a_j^{t+1} + \lambda_j^t \geq a_j^{ts}, \forall t,$ $-a_j^t + \gamma_j^t \geq a_j^{tp}, \forall t,$ $a_j^t + \omega_j^t \geq a_{ij}^{ty}, \forall i, t,$ $a_j^t$ free, $\omega_j^t, \gamma_j^t, \lambda_j^t \geq 0.$

B. Nash Equilibrium Conditions

For each electricity user i, primal-dual complementarity conditions at optimality are expressed as follows:

$f_i^t(a_i^{tf} - a_i^t - \beta_i^t) = 0, \forall t,$ $s_i^t(a_i^{ts} - a_i^t + a_i^{t+1} - \lambda_i^t) = 0, \forall t,$ $p_i^t(a_i^{tp} + a_i^t - \gamma_i^t) = 0, \forall t,$ $x_{ij}^t(a_{ij}^{tx} - a_i^t - \omega_i^t) = 0, \forall j, t,$ $h_i^t(a_i^{th} - \beta_i^{t-1} + \beta_i^t) = 0, \forall t,$ and for each electrical power generating station j:

$s_j^t(a_j^{ts} - a_j^t + a_j^{t+1} - \lambda_j^t) = 0, \forall t,$ $p_j^t(a_j^{tp} + a_j^t - \gamma_j^t) = 0, \forall t$ $y_{ij}^t(a_{ij}^{ty} - a_j^t - \omega_j^t) = 0, \forall i, t.$ To linearize the complementarity conditions:

$f_i^t(a_i^{tf} - a_i^t - \beta_i^t) = 0, \forall i, t,$ becomes:

$\Rightarrow \begin{cases} a_i^t + \beta_i^t - a_i^{tf} \leq Mu_i^{tf}, \\ f_i^t \leq M(1 - u_i^{tf}), \\ u_i^{tf} \text{ binary}. \end{cases}$ In a similar manner, conditions:

$s_i^t(a_i^{ts} - a_i^t + a_i^{t+1} - \lambda_i^t) = 0, \forall i, t,$ are rewritten:

$\Rightarrow \begin{cases} a_i^t - a_i^{t+1} + \lambda_i^t - a_i^{ts} \leq Mu_i^{ts}, \\ s_i^t \leq M(1 - u_i^{ts}), \\ u_i^{ts} \text{ binary}. \end{cases}$ Conditions:

$p_i^t(a_i^{tp} + a_i^t - \gamma_i^t) = 0, \forall i, t,$ are rewritten $\Rightarrow \begin{cases} -a_i^t + \gamma_i^t - a_i^{tp} \leq Mu_i^{tp}, \\ p_i^t \leq M(1 - u_i^{tp}), \\ u_i^{tp} \text{ binary}. \end{cases}$ Conditions:

$x_{ij}^t(a_{ij}^{tx} - a_i^t - \omega_i^t) = 0, \forall i, j, t,$ are rewritten $\Rightarrow \begin{cases} a_i^t + \omega_i^t - a_{ij}^{tx} \leq Mu_i^{tx}, \\ x_{ij}^t \leq M(1 - u_{ij}^{tx}), \\ u_{ij}^{tx} \text{ binary}. \end{cases}$ Conditions:

$h_i^t(a_i^{th} - \beta_i^{t-1} + \beta_i^t) = 0, \forall i, t,$ are rewritten $$\Rightarrow \begin{cases} \beta_i^{t-1} - \beta_i^t - a_i^{th} \leq Mu_i^{th}, \\ \phantom{\beta_i^{t-1} - \beta_i^t - a_i^{th}} h_i^t \leq M(1 - u_i^{th}), \\ \phantom{\beta_i^{t-1} - \beta_i^t - a_i^{th}} u_i^{th} \text{ binary.} \end{cases}$$

Conditions $$s_j^t(a_j^{ts} - a_j^t + a_j^{t+1} - \lambda_j^t) = 0, \forall j, t,$$

are rewritten:

$$\Rightarrow \begin{cases} a_j^t - a_j^{t+1} + \lambda_j^t - a_j^{ts} \leq Mu_j^{ts}, \\ \phantom{a_j^t - a_j^{t+1} + \lambda_j^t - a_j^{ts}} s_j^t \leq M(1 - u_j^{ts}), \\ \phantom{a_j^t - a_j^{t+1} + \lambda_j^t - a_j^{ts}} u_j^{ts} \text{ binary.} \end{cases}$$

Conditions:

$$p_j^t(a_j^{tp} + a_j^t - \gamma_j^t) = 0, \forall j, t,$$

are rewritten:

$$\Rightarrow \begin{cases} -a_j^t + \lambda_j^t - a_j^{tp} \leq Mu_j^{tp}, \\ \phantom{-a_j^t + \lambda_j^t - a_j^{tp}} p_j^t \leq M(1 - u_j^{tp}), \\ \phantom{-a_j^t + \lambda_j^t - a_j^{tp}} u_j^{tp} \text{ binary.} \end{cases}$$

Finally, conditions:

$$y_{ij}^t(a_{ij}^{ty} - a_j^t - \omega_j^t) = 0, \forall i, j, t$$

are rewritten:

$$\Rightarrow \begin{cases} a_j^t + \omega_j^t - a_{ij}^{ty} \leq Mu_{ij}^{ty}, \\ \phantom{a_j^t + \omega_j^t - a_{ij}^{ty}} y_{ij}^t \leq M(1 - u_{ij}^{ty}), \\ \phantom{a_j^t + \omega_j^t - a_{ij}^{ty}} u_{ij}^{ty} \text{ binary.} \end{cases}$$

The following proposition gathers all Nash equilibrium conditions.

Proposition 1: For the MPSGSD, any Nash equilibrium satisfies the following conditions:

$$f_i^t + s_i^t - s_i^{t-1} - p_i^t + \sum_{j=1}^m x_{ij}^t = \sum_{j=1}^m y_{ij}^t, \forall i, t,$$

$$h_i^{t+1} + f_i^t = h_i^t + D_i^t, \forall i, t,$$

$$\sum_{j=1}^m x_{ij}^t \leq L_i^t, \forall t,$$

$$p_i^t \leq K_i^t, \forall i, t,$$

$$s_i^t \leq C_i^t, \forall i, t,$$

$$s_j^t - s_j^{t-1} - p_j^t + \sum_{i=1}^n y_{ij}^t = \sum_{i=1}^n x_{ij}^t, \forall t,$$

$$\sum_{i=1}^m y_{ij}^t \leq L_j^t, \forall t,$$

$$p_j^t \leq K_j^t, \forall t,$$

$$s_j^t \leq C_j^t, \forall t,$$

-continued $$\alpha_i^t + \beta_i^t \geq a_i^{tf}, \forall i, t$$

$$a_i^t - a_i^{t+1} + \lambda_i^t \geq a_i^{ts}, \forall i, t$$

$$-a_i^t + \gamma_i^t \geq a_i^{tp}, \forall i, t,$$

$$a_i^t + \omega_i^t \geq a_{ij}^{tx}, \forall i, j, t,$$

$$\beta_i^{t-1} - \beta_i^t \geq a_i^{th}, \forall i, t,$$

$$a_j^t - a_j^{t+1} + \lambda_j^t \geq a_j^{ts}, \forall j, t,$$

$$-a_j^t + \gamma_j^t \geq a_j^{tp}, \forall j, t,$$

$$a_j^t + \omega_j^t \geq a_{ij}^{ty}, \forall i, j, t,$$

$$\alpha_i^t + \beta_i^t - a_i^{tf} \leq Mu_i^{tf}, \forall i, t,$$

$$f_i^t \leq M(1 - u_i^{tf}), \forall i, t,$$

$$a_i^t - a_i^{t+1} + \lambda_i^t - a_i^{ts} \leq Mu_i^{ts}, \forall i, t,$$

$$s_i^t \leq M(1 - u_i^{ts}), \forall i, t,$$

$$-a_i^t + \gamma_i^t - a_i^{tp} \leq Mu_i^{tp}, \forall i, t,$$

$$p_i^t \leq M(1 - u_i^{tp}), \forall i, t,$$

$$a_i^t + \omega_i^t - a_{ij}^{tx} \leq Mu_i^{tx}, \forall i, j, t,$$

$$x_{ij}^t \leq M(1 - u_{ij}^{tx}), \forall i, j, t,$$

$$\beta_i^{t-1} - \beta_i^t - a_i^{th} \leq Mu_i^{th}, \forall i, t,$$

$$h_i^t \leq M(1 - u_i^{th}), \forall i, t,$$

$$a_j^t - a_j^{t+1} + \lambda_j^t - a_j^{ts} \leq Mu_j^{ts}, \forall j, t,$$

$$s_j^t \leq M(1 - u_j^{ts}), \forall j, t,$$

$$-a_j^t + \gamma_j^t - a_j^{tp} \leq Mu_j^{tp}, \forall j, t,$$

$$p_j^t \leq M(1 - u_j^{tp}), \forall j, t,$$

$$a_j^t + \omega_j^t - a_{ij}^{ty} \leq Mu_j^{ty}, \forall i, j, t,$$

$$y_{ij}^t \leq M(1 - u_{ij}^{ty}), \forall j, t,$$

$$x_i^t, f_i^t, h_i^{t+1}, p_i^t, s_i^t \geq 0, \forall i, t,$$

$$s_i^0 = 0, s_i^T = 0, h_i^1 = 0, h_i^{T+1} = 0, \forall i,$$

$$y_j^t, p_j^t, s_j^t \geq 0, \forall j, t,$$

$$s_j^0 = 0, s_j^T = 0, \forall j,$$

$$a_i^t, \beta_i^t \text{ free}, \forall i, t,$$

$$\omega_i^t, \gamma_i^t, \lambda_i^t \geq 0, \forall i, t,$$

$$a_j^t \text{ free}, \forall j, t,$$

$$\omega_j^t, \gamma_j^t, \lambda_j^t \geq 0, \forall j, t,$$

$$u_i^t, u_{ij}^{tx} \text{ binaries}, \forall i, j, t,$$

$$u_j^t, u_{ij}^{ty} \text{ binaries}, \forall i, j, t.$$

C. Objectives

The computation of the MPSGSD Nash equilibria follows three different objectives.

The first objective $Z_1$ maximizes the sum of all electricity users and electrical power generating stations utilities on the T periods:

$$\max Z_1 = \sum_{t=1}^T \sum_{i=1}^n \sum_{j=1}^m U_{ij}^t + V_{ij}^t.$$

This objective returns the Nash equilibrium that guarantees the maximum total welfare for all agents involved in the MPSGSD.

The second objective $Z_2$ maximizes the minimum electricity user utility on all electricity users, max $Z_2$ subject to:

$$Z_2 \le \sum_{t=1}^{T}\sum_{j=1}^{m} U_{ij}^t, \forall i.$$

This objective returns a Pareto non-dominated Nash equilibrium with respect to all electricity users involved in the MPSGSD.

The third objective $Z_3$ maximizes the minimum electrical power generating station utility on all electrical power generating stations, max $Z_3$, subject to:

$$Z_3 \le \sum_{t=1}^{T}\sum_{i=1}^{n} V_{ij}^t, \forall j.$$

This objective returns a Pareto non-dominated Nash equilibrium with respect to all electrical power generating stations involved in the MPSGSD.

IV. Economic Characterization and Order Relations

From an economic point of view, not all Nash equilibria are interesting. The model is useful at Nash equilibria where electricity users and electrical power generating stations decide to produce, store or delay amounts of energy depending on the production, storage and distribution costs on a given period based on rational decision making and well-defined order conditions on the utility parameters.

A. Economic Solution Characterization

The structure of Nash equilibria is of interest from an economic point of view. To maintain the viability of the smart grid infrastructure, these Nash equilibria are such that electricity users and electrical power generating stations consume or produce, store, delay and distribute energy at every period with none of their decision variables forced to be zero. Proposition 2 reveals how the primal-dual variables depend on the utility parameters for each electricity user and each electrical power generating station at such Nash equilibria.

Proposition 2: For the MPSGSD, any Nash equilibrium has the following primal-dual variables structure. For each electricity user i, at any given period t, $f_i^t>0$, $s_i^t>0$, $p_i^t>0$, and $x_{ij}^t>0$ only if $\beta_i^t = a_i^{tf} - a_i^t$, $\lambda_i^t = a_i^{ts} - a_i^t + a_i^{t+1}$, $\gamma_i^t = a_i^{tp} + a_i^t$, $\omega_i^t = a_{ij}^{tx} - a_i^t$, for any j, and $h_i^t>0$ only if $\beta_i^{t-1} = a_i^{th} + a_i^{tf} - a_i^t$, for any j. Similarly, for each electrical power generating station j, at any given period t, $s_{ij}^t>0$ and $p_{ij}^t>0$ only if:

$\lambda_j^t = a_j^{ts} - a_j^t + a_j^{t+1}$, $y_j^t = a_j^{tp} + a_j^t$, and finally, $y_{ij}^t>0$ only if $\omega_{ij}^t = a_j^{ty} - a_j^t$, for any i.

At least one side of the complementarity conditions should be equal to zero. Therefore, for each electricity user i:

if $f_i^t>0$, one needs $a_i^{tf} - a_i^t - \beta_i^t = 0$, if $s_i^t>0$, one needs $a_i^{ts} - a_i^t + a_i^{t+1} - \lambda_i^t = 0$, if $p_i^t>0$, one needs $a_i^{tp} + a_i^t - \gamma_i^t = 0$, if $x_{ij}^t>0$, one needs $a_{ij}^{tx} - a_i^t - \omega_i^t = 0$, and if $h_i^t>0$, one needs $a_i^{th} - \beta_i^{t-1} + \beta_i^t = 0$ If all these conditions are satisfied, none of the decision variables controlled by electricity user i is forced to be zero. This would imply the expression of the dual variables of electricity user i in terms of its utility parameters as in the proposition. In the same way, for each electrical power generating station j if $s_j^t>0$, one needs $a_j^{ts} - a_j^t + a_j^{t+1} - \lambda_j^t = 0$, if $p_j^t>0$, one needs $a_j^{tp} + a_j^t - \gamma_j^t = 0$, and if $y_{ij}^t>0$, one needs $a_{ij}^{ty} - a_j^t - \omega_j^t = 0$.

If all these conditions are satisfied, none of the decision variables controlled by electrical power generating station j is forced to be zero. This would imply the expression of the dual variables in terms of the utility parameters of electrical power generating station j as in the proposition. The results of proposition 2 imply the following condition on the electricity user's utility parameters.

Corollary 1: The utility coefficients of each electricity user i are such that:

$a_i^{tf} \le a_i^{t+1\,f} + a_i^{t+1\,h} + a_i^{ts}$

Proof. The conditions of proposition 2 yield $\beta_i^{t-1} = a_i^{t-1\,f} - a_i^{t-1\,h} = a_i^{th} + a_i^{tf} - a_i^t$.

Therefore, $a_i^t - a_i^{t-1} = a_i^{th} + a_i^{tf} - a_i^{t-1\,f}$. Hence, $\lambda_i^{t-1} = a_i^{t-1\,s} + a_i^{th} + a_i^{tf} - a_i^{t-1\,f}$, which can be written at period t as $\lambda_i^t = a_i^{ts} + a_i^{t+1\,h} + a_i^{t+1\,f} - a_i^{tf}$.

The non-negativity condition $\lambda_i^t$ leads to the condition $a_i^{tf} \le a_i^{t+1\,f} + a_i^{t+1\,h} + a_i^{ts}$.

B. Order Relations

A description of the order relations between the utility coefficients for each electricity user and each electrical power generating station follows. The order relations result from the Nash equilibrium conditions and two fundamental assumptions of game models: all players are rational and intelligent regardless of the game type.

Firstly, for the same amount of demanded energy received or delayed, a rational electricity user comparing the utilities would prefer receiving energy to delaying it. The first insight can be formally stated:

Insight 1. At any period t, any electricity user i prefers a unit of demanded energy satisfied to a unit of demanded energy delayed. Thus $a_i^{tf} \ge a_i^{th}$.

Secondly, for the same amount of demanded energy delayed or stored, a rational electricity user comparing the utilities prefers storing energy to delaying it. The second insight can be formally stated.

Insight 2. At any period t, any electricity user i prefers a unit of stored energy to a unit of demanded energy delayed. Thus $a_i^{ts} \ge a_i^{th}$.

Thirdly, for the same amount of demanded energy satisfied or stored, a rational electricity user comparing the utilities prefers consuming energy to storing it. This is due to the fact that consuming energy is the first motivation for electricity users to enter the game. The third insight can be formally stated.

Insight 3. At any period t, any electricity user i prefers a unit of demanded energy satisfied to a unit of energy stored. Thus $a_i^{tf} \geq a_i^{ts}$.

Fourthly, for the same amount of energy produced or stored, a rational electricity user or electrical power generating station comparing utilities is indifferent to the type of utility, as electrical power from the different utilities is equivalent in terms of usage.

Insight 4. At any period t, any electricity user i, or electrical power generating station j, is indifferent to whether a unit of energy is produced and a unit of energy is stored. Thus $a_i^{tf} = a_i^{ts}$ and $a_{ij}^{tp} = a_{ij}^{ts}$.

Fifthly, for the same amount of demanded energy consumed or sent, a rational electricity user comparing the utilities prefer to consume. This is again mainly due to the fact that consuming energy is the first motivation for electricity users to enter the game.

Insight 5. At any period t, any electricity user i prefers a unit of demanded energy satisfied to a unit of energy sent. Therefore, $a_i^{tf} \geq a_{ij}^{tx}$.

Sixthly, for the same amount of energy sent or stored, a rational electricity user or electrical power generating station comparing the utilities prefers sending energy to storing it. This is due to the fact that sending energy provides the electricity user or electrical power generating station a financial benefit related to the given period selling price.

Insight 6. At any period t, any electricity user i, or electrical power generating station j, prefers a unit of energy sent to a unit of energy stored.
Thus $a_{ij}^{tx} \geq a_i^{ts}$ and $a_{ij}^{ty} \geq a_{ij}^{ts}$.
The assumption is made that a rational electricity user i delaying part of his demand satisfies it later with $a_i^{th} > 0$.

The following assumption 2 compiles all previous insights.

Assumption 2: The utilities of each electricity user i are such that $$0 < a_i^{th} \leq a_i^{tp} = a_i^{ts} \leq a_{ij}^{tx} \leq a_i^{tf}.$$

The above insights do not add conditions on the model. From the electricity user's point of view, the utility parameters depend on their demands, production, storage capacities and the unit price per period. From the electricity user's and electrical power generating station's points of view, the utility parameters depend upon production capacity and the unit energy selling price per period $\tau^t$. In the following, the assumption is made that a electrical power generating station j would only buy energy from any electricity user i at a price $\tau_i^t$ not exceeding its own unit selling price for the given period $\tau_j^t$.

Assumption 3: The utilities of each electricity user i and electrical power generating station j are such that:

$$a_{ij}^{tx} = \tau_i^t \leq a_{ij}^{ty} = \tau_j^t.$$

Finally, a rational electricity user comparing the utilities prefers to consume a unit of stored energy at a given period if the utility demands a higher price than the price required by a given electrical power generating station to get this unit of energy.

Insight 7. At any period t, any electricity user i prefers a unit of demanded energy satisfied to a unit of energy received. Thus $a_i^{tf} \geq a_{ij}^{ty}$.

Example: Let the utility matrices of a multi periodic smart grid game with shifted demand (MPSGSD) described for 3 electricity users, 1 electrical power generating station and 2 periods, be as follows:

$$[a_i^{th}] = \begin{pmatrix} 0.3 & 0.58 \\ 0.39 & 0.7 \\ 0.59 & 0.53 \end{pmatrix}, [a_i^{tp}] = \begin{pmatrix} 0.54 & 0.95 \\ 0.89 & 0.92 \\ 0.65 & 0.93 \end{pmatrix},$$

$$[a_i^{ts}] = \begin{pmatrix} 0.54 & 0.95 \\ 0.89 & 0.92 \\ 0.65 & 0.93 \end{pmatrix}, [a_{ij}^{tx}] = \begin{pmatrix} 0.86 & 0.97 \\ 0.91 & 0.92 \\ 0.67 & 0.95 \end{pmatrix},$$

$$[a_i^{tf}] = \begin{pmatrix} 0.97 & 0.97 \\ 0.99 & 0.98 \\ 0.97 & 0.97 \end{pmatrix}, [a_j^{ts}] = (0.3 \ 0.48),$$

$$[a_j^{tp}] = (0.3 \ 0.48), \text{ and } [a_{ij}^{ty}] = \begin{pmatrix} 1.163 & 1.031 \\ 1.099 & 1.087 \\ 1.493 & 1.053 \end{pmatrix}$$

These utility parameters satisfy the conditions of the insights 1-7 and corollary 1. The electricity user's demand, production, storage and distribution capacities are given by the matrices:

$$[D_i^t] = \begin{pmatrix} 5 & 5 \\ 5 & 5 \\ 3 & 5 \end{pmatrix}, [K_i^t] = \begin{pmatrix} 1 & 1 \\ 1 & 2 \\ 2 & 2 \end{pmatrix},$$

$$[C_i^t] = \begin{pmatrix} 2 & 1 \\ 3 & 3 \\ 3 & 3 \end{pmatrix}, [L_i^t] = \begin{pmatrix} 3 & 2 \\ 3 & 2 \\ 4 & 2 \end{pmatrix}.$$

The electrical power generating station's production, storage and distribution capacities are given by the matrices:

$[K_j^t] = (10 \ 10), [C_j^t] = (12 \ 12),$ and $[L_j^t] = (11 \ 10)$.

Three Nash equilibria are obtained under the conditions of proposition 1 with the three proposed objectives $Z_1$, $Z_2$ and $Z_3$: With the first objective $Z_1$, the Nash equilibrium obtained maximized the sum of all electricity users and electrical power generating stations utilities and sets the 3 electricity user's utilities to $U_1 = 14:01$, $U_2 = 18:70$, and $U_3 = 14:21$; and the electrical power generating station's utility to $V_1 = 32:85$. While with the second objective $Z_2$, the Pareto Nash equilibrium obtained maximizes the minimum electricity user utility and sets the 3 electricity user's utilities to the optimal values $U_1 = U_2 = U_3 = 15:4505$; and the electrical power generating station's utility to $V_1 = 31:07$. With the third objective $Z_3$, the Pareto Nash equilibrium obtained maximizes the minimum electrical power generating station utility and sets the 3 electricity user's utilities to the optimal values $U_1 = 11:73$, $U_2 = 15:34$; and $U_3 = 12:89$; and the electrical power generating station's utility to $V_1 = 33:27$.

The three different Nash equilibria are displayed in Tables II, III and IV. One can observe that the electricity users satisfy their demands in different ways using the energy received from the electrical power generating station and their own produced energy and stored. With $Z_1$ for example, electricity user 1 consumes $f_1^1 = 2$ units of energy during the first period and delays $h_1^2 = 3$ units to the next period, while receiving $y_{11}^1 = 3$ units from the electrical power generating station and therefore stores $s_1^1 = 2$ for the next period. For period 2, electricity user 1 receives $y_{11}^2 = 5$ units and produces $p_1^2 = 1$ unit. Therefore, electricity user 1 can use the 2 units stored to consume $f_1^2 = 8$ units. Table II displays the amounts of energy demanded vs. energy received, produced, consumed, stored and sent for each electricity user.

TABLE II

Nash Equilibrium with $Z_1$.

| | t = 1 | | | | t = 2 | | | |
|---|---|---|---|---|---|---|---|---|
| Variable | i = 1 | i = 2 | i = 3 | j = 1 | i = 1 | i = 2 | i = 3 | j = 1 |
| $f_i^t$ | 2.00 | 0 | 3.00 | | 8.00 | 10.00 | 5.00 | |
| $s^t$ | 2.00 | 3.00 | 3.00 | 1.00 | | | | |
| $p_i^t$ | 1.00 | 1.00 | 2.00 | 10.00 | 1.00 | 2.00 | 2.00 | 9.00 |
| $h_i^t$ | | | | | 3.00 | 5.00 | 0 | |
| $x_{i1}^t$ | 0 | 0 | 2.00 | | 0 | 0 | 0 | |
| $y_{i1}^t$ | 3.00 | 2.00 | 6.00 | | 5.00 | 5.00 | | |

With $Z_2$, electricity user 1 consumes $f_1^1=0.29$ units of energy during the first period and delays $h_1^2=4.71$ units to the next period, while receiving $y_{11}^1=1.81$ units from the electrical power generating station and producing $p_1^1=1$ unit and therefore storing $s_1^1=2$ for the next period and sending $x_{11}^1=0.52$ units to the electrical power generating station. For period 2, electricity user 1 receives $y_{11}^2=6.71$ units and produces $p_1^2=1$ unit, and therefore can use the 2 units stored to consume $f_1^2=9.71$ units.

TABLE III

Nash Equilibrium with $Z_2$.

| | t = 1 | | | | t = 2 | | | |
|---|---|---|---|---|---|---|---|---|
| Variable | i = 1 | i = 2 | i = 3 | j = 1 | i = 1 | i = 2 | i = 3 | j = 1 |
| $f_i^t$ | 0.29 | 4.71 | 0 | | 9.71 | 5.29 | 8.00 | |
| $s^t$ | 2.00 | 3.00 | 3.00 | 0 | | | | |
| $p_i^t$ | 1.00 | 1.00 | 2.00 | 9.00 | 1.00 | 2.00 | 2.00 | 10.00 |
| $h_i^t$ | | | | | 4.71 | 0.29 | 3.00 | |
| $x_{i1}^t$ | 0.52 | 0 | 1.48 | | 0 | 0 | 0 | |
| $y_{i1}^t$ | 1.81 | 6.71 | 2.48 | | 6.71 | 0.29 | 3.00 | |

With $Z_3$, electricity user 1 consumes $f_1^1=5.00$ units of energy during the first period while receiving $y_{11}^1=5.00$ units from the electrical power generating station. User 1 produces $p_1^1=1$ unit while storing $s_1^1=1$ for the next period. For period 2, electricity user 1 receives $y_{11}^2=3.00$ units and produces $p_1^2=1$ unit. Therefore, electricity user 1 can use the 1 unit stored to consume $f_1^2=5.00$ units.

TABLE IV

Nash Equilibrium with $Z_3$.

| | t = 1 | | | | t = 2 | | | |
|---|---|---|---|---|---|---|---|---|
| Variable | i = 1 | i = 2 | i = 3 | j = 1 | i = 1 | i = 2 | i = 3 | j = 1 |
| $f_i^t$ | 5.00 | 1.00 | 3.00 | | 5.00 | 9.00 | 5.00 | |
| $s^t$ | 1.00 | 0 | 3.00 | 0 | | | | |

TABLE IV-continued

Nash Equilibrium with $Z_3$.

| | t = 1 | | | | t = 2 | | | |
|---|---|---|---|---|---|---|---|---|
| Variable | i = 1 | i = 2 | i = 3 | j = 1 | i = 1 | i = 2 | i = 3 | j = 1 |
| $p_i^t$ | 1.00 | 1.00 | 1.00 | 10.00 | 1.00 | 2.00 | 2.00 | 10.00 |
| $h_i^t$ | | | | | 0 | 4.00 | 0 | |
| $x_{i1}^t$ | 0 | 0 | 1.00 | | 0 | 0 | 0 | |
| $y_{i1}^t$ | 5.00 | 0 | 6.00 | | 3.00 | 7.00 | 0 | |

V. Computational Results

The system and methods of the present invention compute Nash equilibria for a Multi periodic Smart Grid game with Shifted Demand (MPSGSD). To do so, the 0-1 mixed integer linear programming formulation in Proposition 1 is used to maximize each one of the three proposed objective functions $Z_1$, $Z_2$ or $Z_3$. With $Z_1$, the Nash equilibrium maximizing the overall sum of all the agents' utilities is targeted. With $Z_2$, the Nash equilibrium maximizing the minimum electricity user utility is targeted. Finally, with $Z_3$, the Nash equilibrium maximizing the minimum electrical power generating station utility is targeted. 60 different instances of Multi periodic Smart Grid games with Shifted Demand (MPSGSD) were randomly generated with data satisfying all previously mentioned assumptions and insights.

Table V presents the computational experiments on the randomly generated MPSGSD games with different size. These experimental results were obtained under Linux HP workstation with 2.4 GHz Intel Core processor, and 2.93 GB RAM. The state of the art software Cplex 12.7.1 was used for the optimization of the 0-1 mixed linear programs. The computational results are obtained on two sets of instances.

The first set of instances "Set 1" (S01-S30) involves a number of electricity users ranging from 200 to 600 and a number of electrical power generating stations ranging from 4 to 20. The second set of instances "Set 2" (S31-S60) involves a number of electricity users ranging from 1000 to 5000 and a number of electrical power generating stations ranging from 4 to 20.

For both sets of instances, the electricity users needs can be fully satisfied by the electrical power generating stations at the end of the 2 to 10 time periods. For the entries in table V, the column "Instance" indicates the name of the instance solved. The column "Size" indicates the original size of the MSGSD instance. The columns "n", "p" and "T" indicate, respectively, the number of electricity users, the number of electrical power generating stations and time periods. The column "time" indicates the execution time (in seconds) required to compute a Nash equilibrium which maximizes the overall utility of all agents Z1 and the non-dominated Pareto Nash equilibria $Z_2$ and $Z_3$. Finally, the column "Avg." displays the average execution time (in seconds) required to compute a Nash equilibrium that assigns the same weights to the three different utility objectives.

TABLE V

Results for Sets 1 and 2.

| Instance | Size | | | Time | | | | Instance | Size | | | Time | | | |
|---|---|---|---|---|---|---|---|---|---|---|---|---|---|---|---|
| Name | n | p | t | $Z_1$ | $Z_2$ | $Z_3$ | Avg. | Name | n | p | t | $Z_1$ | $Z_2$ | $Z_3$ | Avg. |
| S01 | 200 | 4 | 2 | 0.06 | 0.13 | 0.09 | 0.09 | S31 | 1000 | 4 | 2 | 2.15 | 10.4 | 2.77 | 5.00 |
| S02 | 200 | 6 | 2 | 0.09 | 0.16 | 0.10 | 0.12 | S32 | 1000 | 6 | 2 | 4.34 | 12.5 | 4.79 | 7.21 |
| S03 | 200 | 8 | 2 | 0.10 | 0.20 | 0.17 | 0.16 | S33 | 1000 | 8 | 2 | 5.82 | 22.7 | 6.32 | 11.61 |
| S04 | 200 | 10 | 2 | 0.11 | 0.41 | 0.15 | 0.22 | S34 | 1000 | 10 | 2 | 7.48 | 45.6 | 8.68 | 20.60 |
| S05 | 200 | 12 | 4 | 0.24 | 0.64 | 0.35 | 0.41 | S35 | 1000 | 12 | 4 | 9.37 | 67.8 | 10.43 | 29.19 |
| S06 | 200 | 14 | 4 | 0.28 | 0.68 | 0.41 | 0.46 | S36 | 1000 | 14 | 4 | 11.66 | 81.4 | 12.33 | 35.11 |
| S07 | 200 | 16 | 4 | 0.34 | 0.71 | 0.50 | 0.52 | S37 | 1000 | 16 | 4 | 12.88 | 99.1 | 14.43 | 42.14 |

TABLE V-continued

Results for Sets 1 and 2.

| Instance Name | Size | | | Time | | | | Instance Name | Size | | | Time | | | |
|---|---|---|---|---|---|---|---|---|---|---|---|---|---|---|---|
| | n | p | t | $Z_1$ | $Z_2$ | $Z_3$ | Avg. | | n | p | t | $Z_1$ | $Z_2$ | $Z_3$ | Avg. |
| S08 | 200 | 18 | 8 | 0.77 | 3.07 | 1.44 | 1.76 | S38 | 1000 | 18 | 8 | 16.41 | 386.1 | 17.98 | 140.17 |
| S09 | 200 | 20 | 8 | 0.93 | 3.46 | 1.70 | 2.03 | S39 | 1000 | 20 | 8 | 17.25 | 445.3 | 19.75 | 160.77 |
| S10 | 200 | 20 | 10 | 1.33 | 4.72 | 2.43 | 2.83 | S40 | 1000 | 20 | 10 | 21.86 | 534.6 | 24.58 | 193.67 |
| S11 | 400 | 4 | 2 | 0.15 | 0.20 | 0.17 | 0.17 | S41 | 2000 | 4 | 2 | 4.52 | 35.7 | 7.21 | 15.81 |
| S12 | 400 | 6 | 2 | 0.16 | 0.24 | 0.19 | 0.20 | S42 | 2000 | 6 | 2 | 5.79 | 47.1 | 8.46 | 20.46 |
| S13 | 400 | 8 | 2 | 0.19 | 0.30 | 0.25 | 0.25 | S43 | 2000 | 8 | 2 | 6.98 | 77.4 | 10.87 | 31.74 |
| S14 | 400 | 10 | 2 | 0.18 | 0.78 | 0.31 | 0.42 | S44 | 2000 | 10 | 2 | 8.73 | 145.2 | 13.65 | 55.86 |
| S15 | 400 | 12 | 4 | 0.45 | 1.62 | 0.63 | 0.90 | S45 | 2000 | 12 | 4 | 10.20 | 163.4 | 15.42 | 63.01 |
| S16 | 400 | 14 | 4 | 0.54 | 1.51 | 0.80 | 0.95 | S46 | 2000 | 14 | 4 | 12.71 | 187.4 | 18.91 | 73.01 |
| S17 | 400 | 16 | 4 | 0.62 | 1.84 | 0.93 | 1.13 | S47 | 2000 | 16 | 4 | 14.78 | 232.5 | 23.45 | 90.24 |
| S18 | 400 | 18 | 8 | 2.24 | 6.79 | 2.29 | 3.77 | S48 | 2000 | 18 | 8 | 26.86 | 1254.2 | 41.24 | 440.77 |
| S19 | 400 | 20 | 8 | 2.47 | 7.47 | 3.09 | 4.34 | S49 | 2000 | 20 | 8 | 35.92 | 1476.3 | 55.12 | 522.45 |
| S20 | 400 | 20 | 10 | 3.16 | 14.26 | 4.20 | 7.21 | S50 | 2000 | 20 | 10 | 44.38 | 1673.5 | 76.81 | 598.23 |
| S21 | 600 | 4 | 2 | 0.21 | 1.34 | 0.25 | 0.60 | S51 | 5000 | 4 | 2 | 5.80 | 134.5 | 7.32 | 49.21 |
| S22 | 600 | 6 | 2 | 0.24 | 1.88 | 0.27 | 0.80 | S52 | 5000 | 6 | 2 | 6.35 | 172.3 | 8.91 | 62.53 |
| S23 | 600 | 8 | 2 | 0.26 | 2.47 | 0.34 | 1.02 | S53 | 5000 | 8 | 2 | 7.05 | 220.5 | 9.87 | 79.13 |
| S24 | 600 | 10 | 2 | 0.37 | 3.01 | 0.33 | 1.24 | S54 | 5000 | 10 | 2 | 8.58 | 284.4 | 11.60 | 101.53 |
| S25 | 600 | 12 | 4 | 0.67 | 3.72 | 1.18 | 1.86 | S55 | 5000 | 12 | 4 | 10.71 | 308.6 | 14.50 | 111.27 |
| S26 | 600 | 14 | 4 | 0.86 | 5.43 | 1.57 | 2.62 | S56 | 5000 | 14 | 4 | 15.37 | 354.4 | 25.63 | 131.80 |
| S27 | 600 | 16 | 4 | 1.09 | 7.11 | 2.06 | 3.42 | S57 | 5000 | 16 | 4 | 20.70 | 435.6 | 35.82 | 164.04 |
| S28 | 600 | 18 | 8 | 2.97 | 11.41 | 4.11 | 6.16 | S58 | 5000 | 18 | 8 | 53.21 | 1453.4 | 87.30 | 531.30 |
| S29 | 600 | 20 | 8 | 3.23 | 14.65 | 5.32 | 7.73 | S59 | 5000 | 20 | 8 | 88.60 | 1811.5 | 102.52 | 667.54 |
| S30 | 600 | 20 | 10 | 4.68 | 17.87 | 6.45 | 9.67 | S60 | 5000 | 20 | 10 | 132.50 | 3421.3 | 147.30 | 1233.70 |
| Avg. | 400.0 | 12.8 | 4.6 | 1.0 | 3.9 | 1.4 | 2.1 | | 2666.7 | 12.8 | 4.6 | 21.0 | 519.8 | 28.1 | 189.6 |

Figure 6:
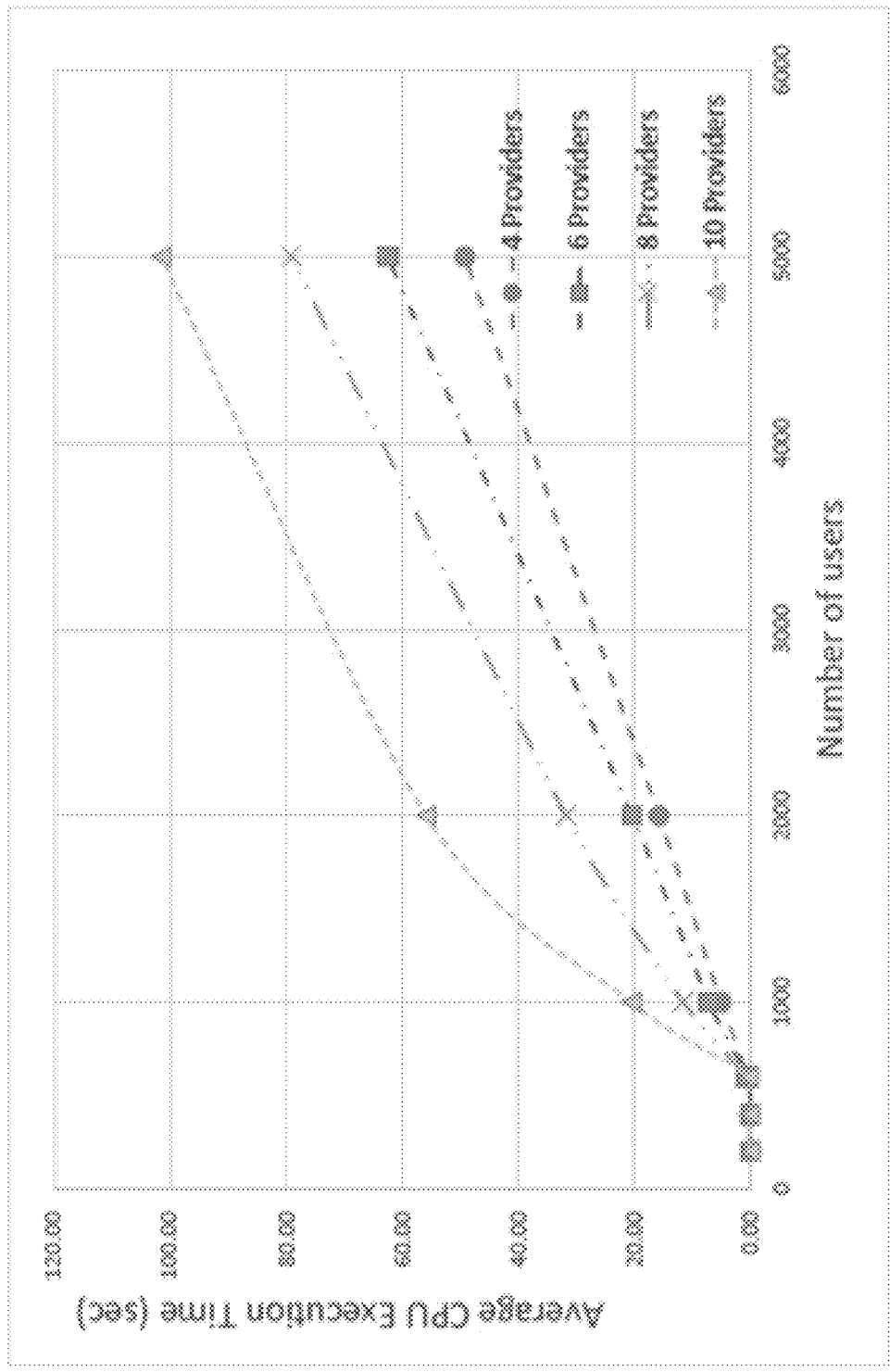
FIG. 6 is a graph representing the average CPU time for 2 periods, according to certain embodiments.

The execution time increases with respect to the number of electricity users, electrical power generating stations or periods. As shown in FIG. 6, the rate of increase is quasi-linear with respect to the number of electricity users. While the game theoretical proposed by inventors in a previous work was tested on instances with a maximum number of 100 electricity users and 4 electrical power generating stations, the non-cooperative multi-periodic smart grid game with shifted demand of the present invention was tested on instances with a maximum number of 5000 electricity users, 20 electrical power generating stations and 10 periods. The present invention includes new features like demand shifting, production, storing and selling of energy by electricity users to electrical power generating stations, and tackles problems with larger size and multiple periods.

Demand response management plays an essential role in the effectiveness of the smart grid. The challenge is to strike a balance among different players with competing requirements. Game theory is a promising candidate tool to manage such competition. In the present invention, a non-cooperative multi-periodic smart grid game with shifted demand is disclosed for managing the demands of a group of smart grid electricity users focusing on shifted demand paradigm. Using primal-dual optimality conditions, the Nash equilibrium conditions for the non-cooperative multi-periodic smart grid game with shifted demand were set. A 0-1 mixed integer linear programming approach was used to compute the Nash equilibria of the obtained games. The computational results are obtained based on randomly generated multi periodic smart grid games with shifted demand. The computational results show that it takes a reasonable amount of time to find a Nash equilibrium even for the largest instances considered. These computational times make the game theoretic approach of the present invention effective and practical for the generation and distribution of energy.

Figure 7:
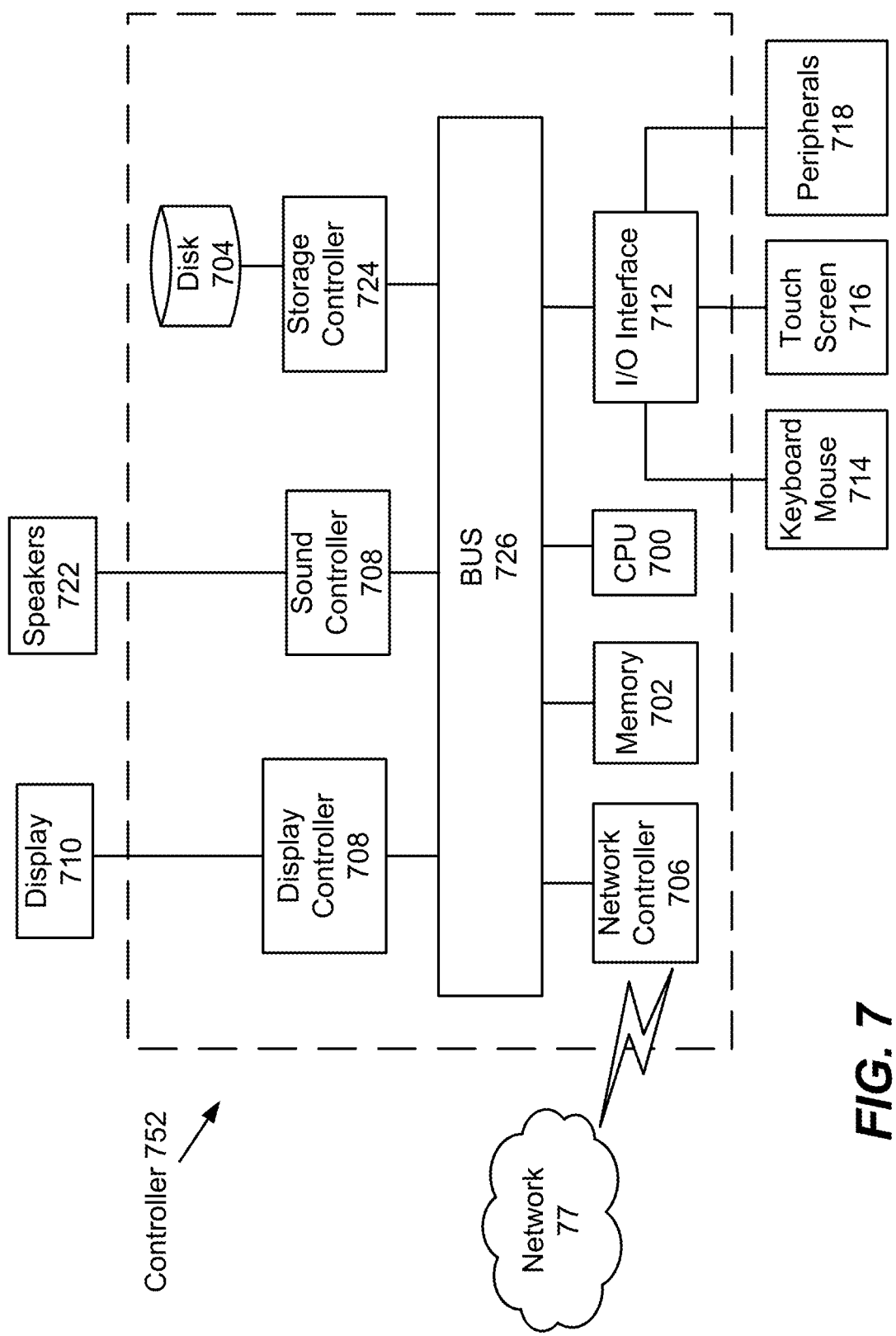
FIG. 7 is an exemplary illustration of computing hardware used in the smart meter controller of the exemplary embodiments.

Next, a hardware description of the controller 352 according to exemplary embodiments is described with reference to FIG. 7. In FIG. 7, the controller described is representative of the smart meter controller 752 in which the controller is computing device which includes a CPU 700 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UN17, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN subnetworks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
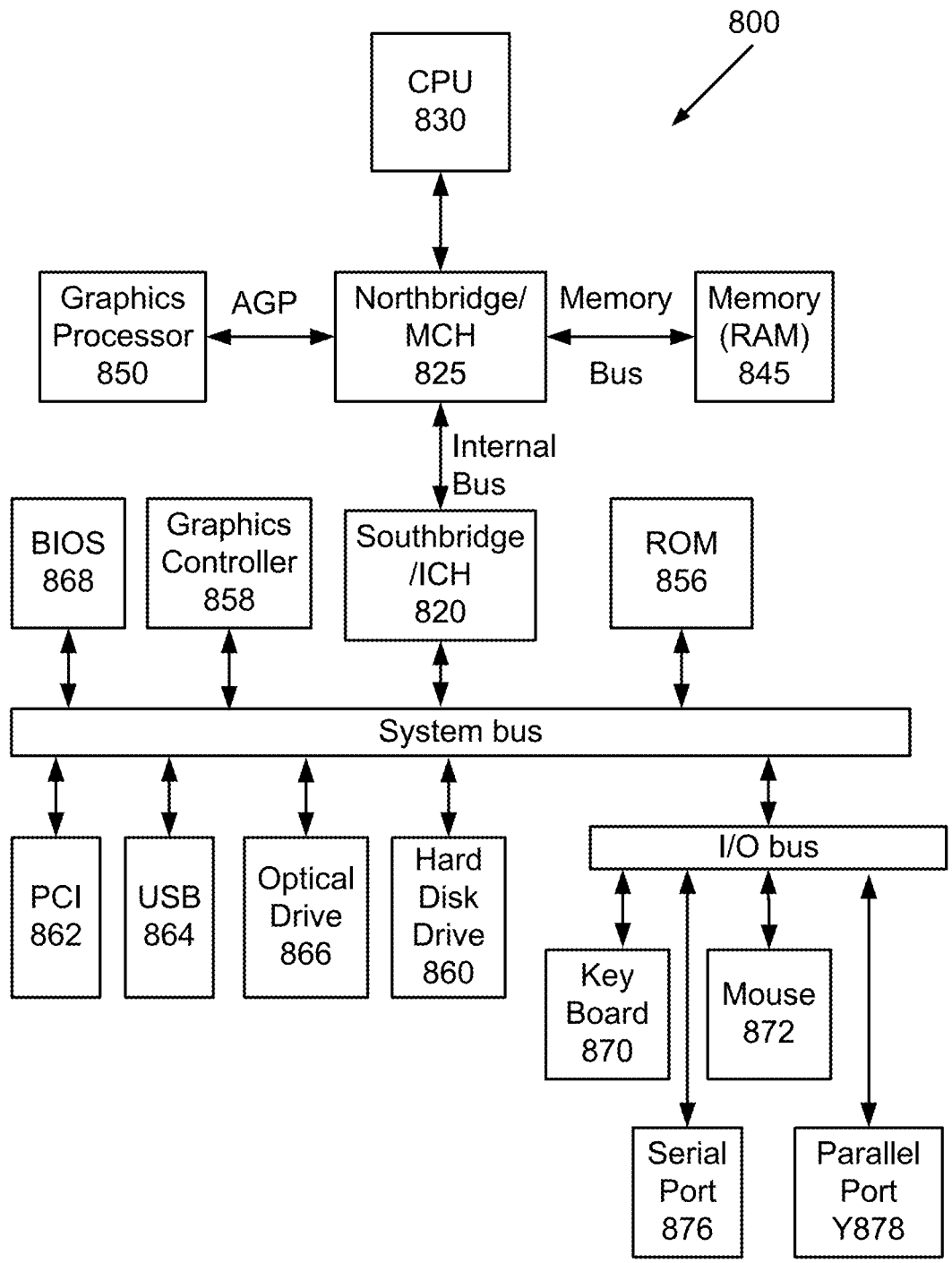
FIG. 8 is an exemplary schematic diagram of a data processing system used within the controller of the smart meter, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
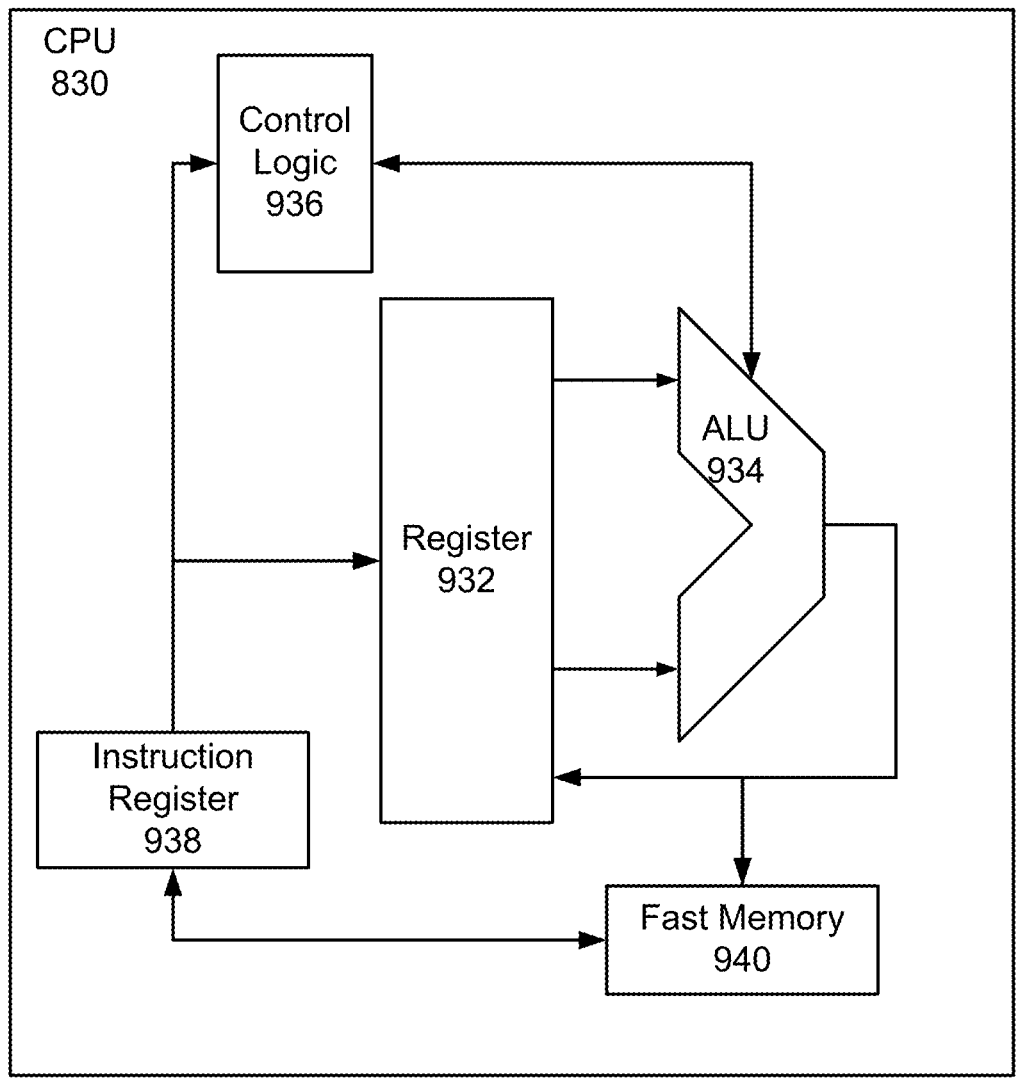
FIG. 9 is an exemplary schematic diagram of a CPU used in the controller of the smart meter, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
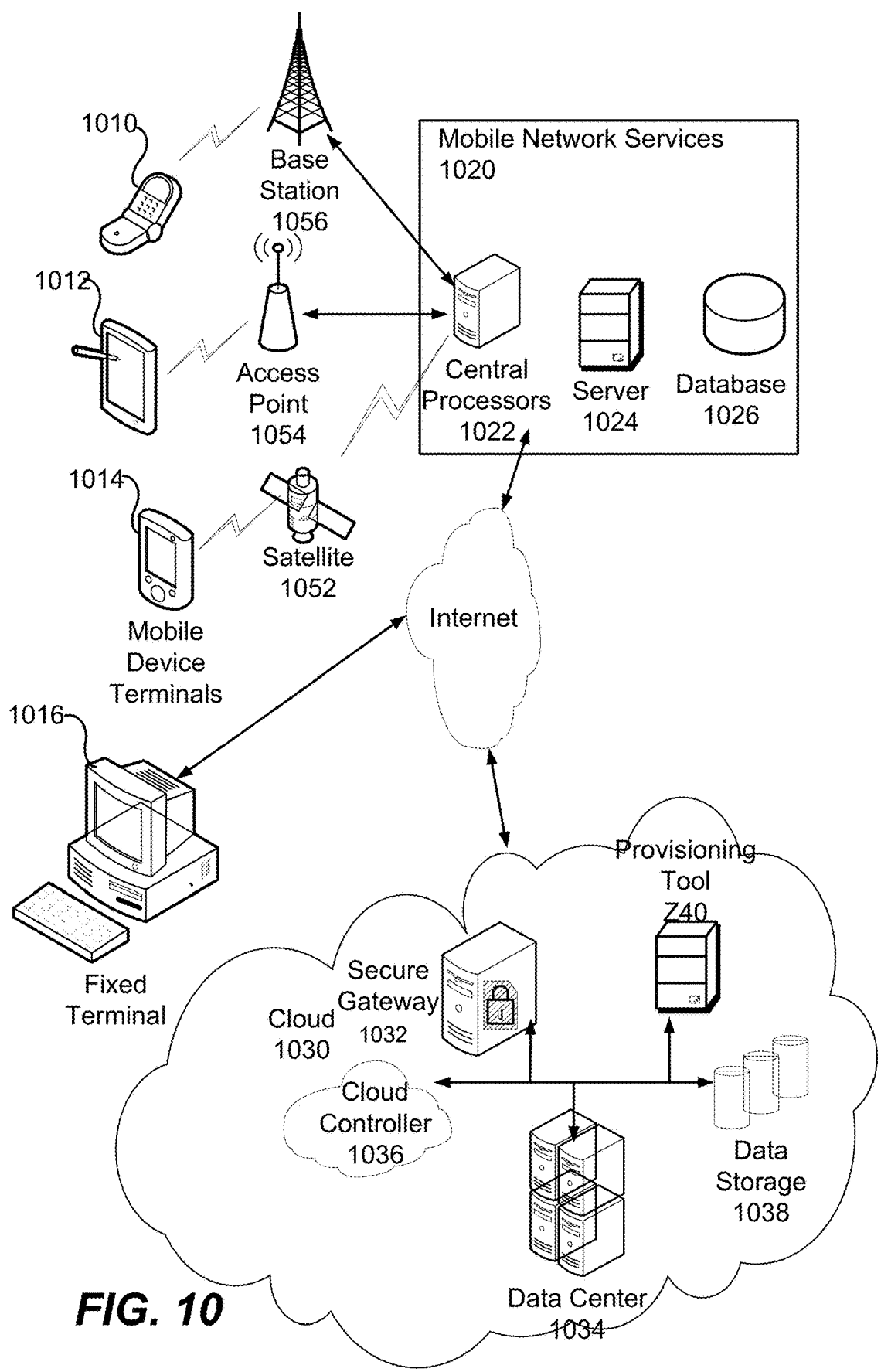
FIG. 10 is an illustration of a non-limiting example of distributed components which may share processing with the smart grid controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A smart meter system for managing demand side electrical transactions with shifted demand in a smart grid, comprising:
the smart grid;
at least one electrical power generating station connected to the smart grid,
at least one utility, having a utility power distribution node and a communications node;
a power distribution network connected between the at least one electrical power generating station and the utility power distribution node;
at least one distribution substation connected by power transmission lines to the utility power distribution node;
a plurality of smart meters bidirectionally connected to one another, wherein each smart meter is configured to exchange data communications and electrical power with any one of the smart meters connected to it;
a plurality of electricity users, each electricity user having electrical devices connected to one of the smart meters of the plurality of smart meters, wherein each smart meter is connected by power cables to the at least one distribution substation;
the smart grid including a bidirectional communications network connected between the at least one electrical power generating station, the utility communications node and each smart meter;
a neighborhood area network (NAN) connected to each smart meter of the plurality of electricity users, wherein the NAN is connected to a data concentrator;
a wide area network (WAN) connected between the data concentrator and the at least one utility communications node;
a smart meter controller including a smart meter circuitry located with each smart meter, wherein the smart meter controller is configured to receive data communications from at least one electrical power generating station, the utility communications node, and from each of the plurality of smart meters connected to the NAN, wherein the smart meter circuitry of each smart meter includes program instructions configured to analyze the data communications and determine at least one electrical transaction of the smart meter by using a non-cooperative multi-periodic smart grid game with shifted demand,
wherein the program instructions are further configured to analyze the data communications using the non-cooperative multi-periodic smart grid game with shifted demand to reach a Nash equilibrium in which each of the plurality of electricity users and the power distribution network simultaneously maximize their individual utility functions over consecutive periods of time, wherein reaching the Nash equilibrium provides the demanded electrical power to each electricity user while minimizing the electrical power costs of each electricity user; and
wherein the program instructions are further configured to perform the at least one electrical transaction based on the determination.

2. The smart meter system of claim 1, wherein the electrical transaction is at least one of distributing electrical power from the distribution substation to the smart meter of an electricity user, storing electrical power in a storage battery of the electricity user, supplying electrical power by the smart meter from a storage battery of the electricity user to at least one smart meter in the neighborhood network, supplying electrical power by the smart meter from a storage battery of the at least one user to the distribution substation, demanding, by the smart meter, electrical power from the distribution station and temporally shifting an energy transaction between the smart meter and the distribution substation.

3. The smart meter system of claim 1, wherein the electrical transaction is temporally shifting an energy transaction which comprises at least one of shifting the reception of electrical power until a time period when a cost of a unit of electricity is lower than the cost of the unit of electricity in a current time period and temporally shifting the distribution of electrical power from the electricity user to the power distribution substation until a sales price of a unit of electricity is higher than a sales price of the unit of electricity in a current time period.

4. The smart meter system of claim 1, wherein the electrical power generating station is at least one of a hydroelectric power plant, a coal-fired power plant, a nuclear power plant, a solar power plant and a wind power plant.

5. The smart meter system of claim 1, wherein the smart meter of the electricity user is connected to a metering gateway of a home area network (HAN), wherein the HAN is operatively connected to the electrical devices of the electricity user, the electrical devices comprising at least one of an electrical storage battery, a vehicle, an electricity meter, a water meter, a gas meter, an air conditioning thermostat, a user computer, a mobile device, a home security system, a solar power generation system, an electricity generator, an electrical appliance and a user electronic device.

6. The smart meter system of claim 1, wherein each smart meter is connected by the neighborhood area network (NAN) to the utility communications node and wherein analyzing the data using the non-cooperative multi-periodic smart grid game with shifted demand further comprises reaching a Nash equilibrium, wherein reaching a Nash equilibrium by each of the smart meters optimizes a utility power transaction.

7. The smart meter system of claim 1, wherein each electrical power generating station includes a controller having circuitry configured to receive data communications from each smart meter, wherein the circuitry of each electrical power generating station includes program instructions configured to analyze the data communications from each smart meter and to determine at least one electrical transaction of the electrical power generating station by using a non-cooperative smart grid game with shifted demand to reach a Nash equilibrium, wherein reaching a Nash equilibrium optimizes transactions between the electrical power generating station and the plurality of smart meters to the benefit of the electrical power generating station.

8. The smart meter system of claim 1, wherein the controller of each smart meter acts as an agent in the non-cooperative multi-periodic smart grid game with shifted demand, and a linear objective function is obtained for the utility of each agent of the smart grid game with shifted demand.

9. The smart meter system of claim 1, wherein:
the home area network is configured to connect to at least one of a smart appliance located in a home;
the neighborhood area network is configured to connect the smart meters in a neighborhood to one another via a mesh network; and
the wide area network is configured to connect the data concentrator to the utility and to a distribution controller of each distribution substation.

* * * * *